US006915279B2

(12) United States Patent
Hogan et al.

(10) Patent No.: US 6,915,279 B2
(45) Date of Patent: Jul. 5, 2005

(54) SYSTEM AND METHOD FOR CONDUCTING SECURE PAYMENT TRANSACTIONS

(75) Inventors: Edward Hogan, Larchmont, NY (US); Carl Campbell, Newtown Square, PA (US); Arthur Kranzley, Pound Ridge, NY (US); Bruce Rutherford, Stamford, CT (US); Stephen Orfei, Katonah, NY (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 10/096,271

(22) Filed: Mar. 11, 2002

(65) Prior Publication Data

US 2003/0120554 A1 Jun. 26, 2003

Related U.S. Application Data

(63) Continuation-in-part of application No. 09/963,274, filed on Sep. 26, 2001.
(60) Provisional application No. 60/307,575, filed on Jul. 24, 2001, provisional application No. 60/295,630, filed on Jun. 4, 2001, provisional application No. 60/280,776, filed on Apr. 2, 2001, and provisional application No. 60/274,785, filed on Mar. 9, 2001.

(51) Int. Cl.[7] ............................................. G06F 17/46
(52) U.S. Cl. ............................. 705/64; 705/39; 705/65; 705/67; 705/74
(58) Field of Search ............................. 705/40, 34, 64, 705/67, 74, 75, 76, 42, 44, 65; 715/512, 513, 539; 380/24

(56) References Cited

U.S. PATENT DOCUMENTS

| 5,317,636 | A | | 5/1994 | Vizcaino ...................... 380/23 |
|---|---|---|---|---|
| 5,678,010 | A | | 10/1997 | Pittenger et al. ............ 395/244 |
| 5,724,424 | A | | 3/1998 | Gifford ........................ 705/79 |
| 5,754,656 | A | | 5/1998 | Nishioka et al. ............... 380/25 |
| 5,761,306 | A | | 6/1998 | Lewis ........................... 380/21 |
| 5,790,677 | A | | 8/1998 | Fox et al. ..................... 380/24 |
| 5,883,810 | A | | 3/1999 | Franklin et al. ........ 364/479.02 |
| 5,903,878 | A | * | 5/1999 | Talati et al. .................. 705/26 |
| 5,956,699 | A | | 9/1999 | Wong et al. .................. 705/39 |
| 6,072,870 | A | * | 6/2000 | Nguyen et al. ............... 705/79 |

(Continued)

FOREIGN PATENT DOCUMENTS

| AU | 6053700 | 1/2001 | |
|---|---|---|---|
| EP | 1 017 030 A2 | 7/2000 | ............. G07F/7/10 |
| EP | 1 028 401 A2 | 8/2000 | ............. G07F/7/08 |
| WO | WO 01/01622 A2 | 1/2001 | |
| WO | WO 01/07873 A2 | 2/2001 | ............. G01F/7/00 |
| WO | WO 01/26062 A1 | 4/2001 | ............. G07F/7/10 |
| WO | WO 01/67215 A2 | 9/2001 | ............. G06F/1/00 |
| WO | WO 01/69556 A2 | 9/2001 | ........... G07F/19/00 |
| WO | WO 01/71675 A1 | 9/2001 | ............. G07F/7/12 |
| WO | WO 01/84509 A2 | 11/2001 | |
| WO | WO 02/15077 A1 | 2/2002 | ........... G06F/17/60 |

Primary Examiner—James P. Trammell
Assistant Examiner—Daniel L. Greene
(74) Attorney, Agent, or Firm—Baker Botts LLP

(57) ABSTRACT

In a secure electronic payment system, authentication data is sent from a payment account issuer to user software operated by a purchaser. The user software sends the authentication data to a merchant using hidden fields on the Web page of the merchant. The merchant generates an authorization request message based upon the authentication data. The authorization request message is sent to a payment organization either directly from the merchant or via the merchant's acquirer. The payment organization forwards the authorization request message to a payment account issuer which verifies the authorization request message, thereby generating an authorization response message which is sent to the payment organization. The payment organization forwards the authorization response message to the merchant, either directly or via the acquirer.

81 Claims, 9 Drawing Sheets

U.S. PATENT DOCUMENTS

| | | | |
|---|---|---|---|
| 6,098,053 A | 8/2000 | Slater | 705/44 |
| 6,205,436 B1 | 3/2001 | Rosen | 705/65 |
| 6,227,447 B1 | 5/2001 | Campisano | 235/380 |
| 6,332,134 B1 | 12/2001 | Foster | 705/39 |
| 6,343,284 B1 | 1/2002 | Ishikawa et al. | 705/67 |
| 6,370,514 B1 * | 4/2002 | Messner | 705/14 |
| 2001/0034720 A1 * | 10/2001 | Armes | 705/65 |
| 2001/0037451 A1 * | 11/2001 | Bhagavatula et al. | 713/155 |
| 2001/0047281 A1 * | 11/2001 | Keresman, III et al. | 705/2 |
| 2001/0047335 A1 * | 11/2001 | Arndt et al. | 705/44 |
| 2001/0051902 A1 * | 12/2001 | Messner | 705/26 |
| 2002/0032663 A1 * | 3/2002 | Messner | 705/72 |
| 2002/0046169 A1 * | 4/2002 | Keresman, III et al. | 705/41 |
| 2002/0052784 A1 * | 5/2002 | Sherwin et al. | 705/14 |
| 2002/0083010 A1 | 6/2002 | Kim | 705/64 |

* cited by examiner

SYSTEM AND METHOD FOR CONDUCTING SECURE PAYMENT TRANSACTIONS

CROSS-REFERENCE TO RELATED APPLICATIONS

This application is a continuation-in-part of U.S. patent application Ser. No. 09/963,274, entitled "A Universal and Interoperable System and Method Utilizing a Universal Cardholder Authentication Field (UCAF) For Authentication Data Collection and Validation," filed on Sep. 26, 2001, which is incorporated herein by reference in its entirety; this application also claims priority to the following additional applications, all of which are incorporated herein by reference in their entireties: U.S. Provisional Patent Application No. 60/274,785, entitled "System and Method for Secure Payment Application (SPA) and Universal Cardholder Authentication," filed on Mar. 9, 2001; U.S. Provisional Patent Application No. 60/280,776, entitled "System and Method for Secure Payment Application (SPA) and Universal Cardholder Authentication," filed on Apr. 2, 2001; U.S. Provisional Patent Application No. 60/295,630, entitled "Method and Process for a Secure Payment Application Using a Universal Cardholder Authentication Field," filed on Jun. 4, 2001; U.S. Provisional Patent Application No. 60/307,575, entitled "Method and System for Conducting Transactions Over a Communication Network Using a Secure Payment Application," filed on Jul. 24, 2001; U.S. patent application Ser. No. 09/886,486, entitled "Method and System for Conducting Secure Payments Over a Computer Network Without a Pseudo or Proxy Account Number," filed on Jun. 22, 2001; and U.S. patent application Ser. No. 09/886,485, entitled "Method and System for Conducting Secure Payments Over a Computer Network," filed on Jun. 22, 2001.

BACKGROUND OF THE INVENTION

On-line shopping offers unprecedented ease and convenience for consumers, while enabling merchants to reduce costs and obtain new customers. However, many consumers have been reluctant to take advantage of these benefits due to fear of theft of sensitive information such as credit card numbers. Efforts have been made to increase the security of such information. For example, in the secure socket layer (SSL) technique, messages sent between the consumer and the merchant are encrypted, thereby making it more difficult for a third party to intercept and use the information. However, this method does not provide the merchant with any verification of the identity of the consumer. Accordingly, if a third party were to obtain a credit card number by other fraudulent means such as theft of physical credit card, the SSL method would not prevent the third party from fraudulently using the stolen information.

Secure Electronic Transaction (SET™) techniques attempt to solve the foregoing problems by using digital certificates to authenticate the consumer/cardholder, the merchant, and the credit card issuer. Each certificate is issued by a trusted certificate authority. While SET™ is currently the most secure way to handle payments over the Internet, it requires digital certificates and cryptographic software to be installed and operated on the cardholder's computer.

SUMMARY OF THE INVENTION

It is therefore an object of the present invention to provide a payment system which enables a consumer to make on-line purchases without compromising sensitive information such as the consumer's account number.

It is an additional object of the present invention to provide a payment system in which the identity of a consumer is authenticated without requiring the issuance of a large number of digital certificates.

It is still a further object of the present invention to provide a payment system in which information security is maintained and the identities of on-line consumers are authenticated, without requiring consumers to download large software files, and without employing computationally intensive calculations which might slow down the consumer's computer.

These and other objects are accomplished by the following aspects of the present invention.

In accordance with one aspect of the present invention, user software receives a set of Web page data to be used for displaying a Web page. The user software determines whether the Web page includes one or more hidden fields. If the Web page includes the hidden fields, the user software selects a first payment procedure to be performed. The first payment procedure includes filling the hidden fields with hidden data, in order to send the hidden data to a merchant. If the Web page does not include the hidden fields, the user software selects a second payment procedure to be performed. The second payment procedure includes filling one or more visible fields of the Web page with purchase data, in order to send the purchase data to the merchant.

In accordance with an additional aspect of the present invention, user software receives a set of Web page data to be used for displaying a Web page which includes one or more hidden fields. The user software receives authentication data from a payment account issuer, the authentication data being for authenticating the identity of an account holder of a payment account issued by the payment account issuer. The user software fills the hidden fields with the authentication data, in order to send the authentication data to a merchant.

In accordance with yet another aspect of the present invention, user software receives a first set of web page data to be used for displaying a first Web page. The user software determines whether the first Web page includes a first hidden field. The first hidden field is for indicating that the Web page is capable of being used for performing a single-click payment procedure. The user software fills the first hidden field with data for informing a merchant that the user software is being used for performing at least one payment transaction.

BRIEF DESCRIPTION OF THE DRAWINGS

Further objects, features, and advantages of the present invention will become apparent from the following detailed description taken in conjunction with the accompanying figures showing illustrative embodiments of the invention, in which.

Throughout the figures, unless otherwise stated, the same reference numerals and characters are used to denote like features, elements, components, or portions of the illustrated embodiments.

DETAILED DESCRIPTION OF THE INVENTION

Figure 4:
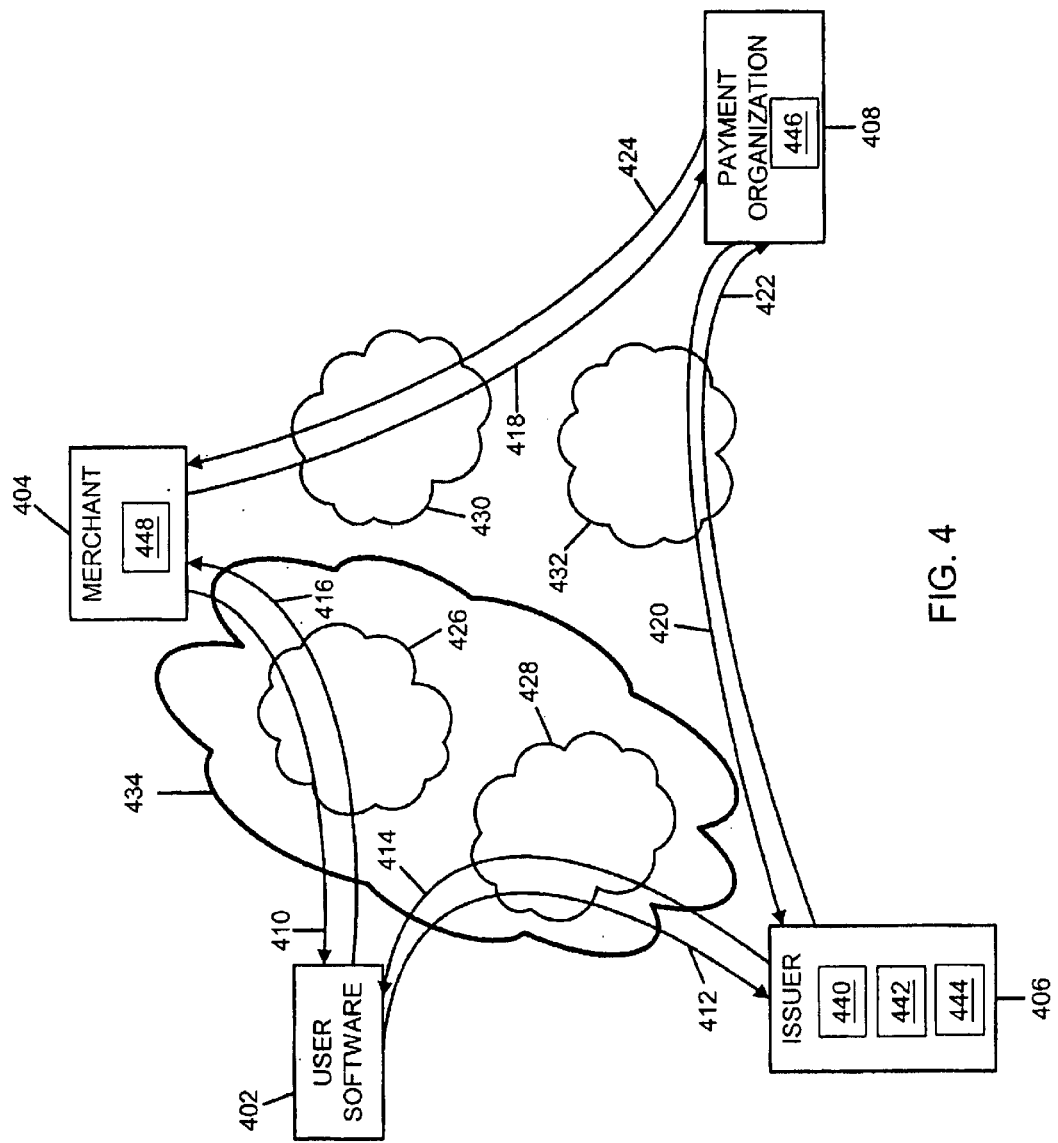
FIG. 4 is a block diagram illustrating an exemplary system for conducting a payment transaction in accordance with the present invention.

FIG. 4 illustrates an exemplary system for performing secure payment transactions in accordance with the present invention. The system includes user software 402, a merchant 404 selling goods and/or services, a payment organization 408 such as the MasterCard® payment organization, and a payment account issuer 406. The user software 402 runs on an access device operated by a purchaser—i.e., the purchaser is the user of the software 402. The access device can be, for example, a computer, a personal digital assistant (PDA), or a mobile telephone. Preferably, the access device runs a Web browser in addition to, or as part of, the user software 402. The Web browser preferably supports name-based addressing of Web page fields, in order to enable identification of hidden and visible fields using names which are uniform for multiple merchants and account holders. The issuer 406 is typically a bank which has issued, to the purchaser, a credit card account or other payment account being used to purchase the goods and/or services from the merchant. The purchaser can be referred to as an account holder of the account. The system uses authentication data 414 which effectively travels in a loop from the issuer 406, to the user software 402, to the merchant 404, to the payment organization 408, and back to the issuer 406, as is discussed in further detail below. The data 420 received by the issuer 406 should be derived from the original authentication data 414, provided that no improper operations have been performed upon the authentication data 414 during its trip around the loop. Therefore, the issuer 406 can authenticate the identity of the account holder and verify the authenticity of the transaction based upon the authentication data 414 and the data 420 received from the payment organization 408.

Figure 8:
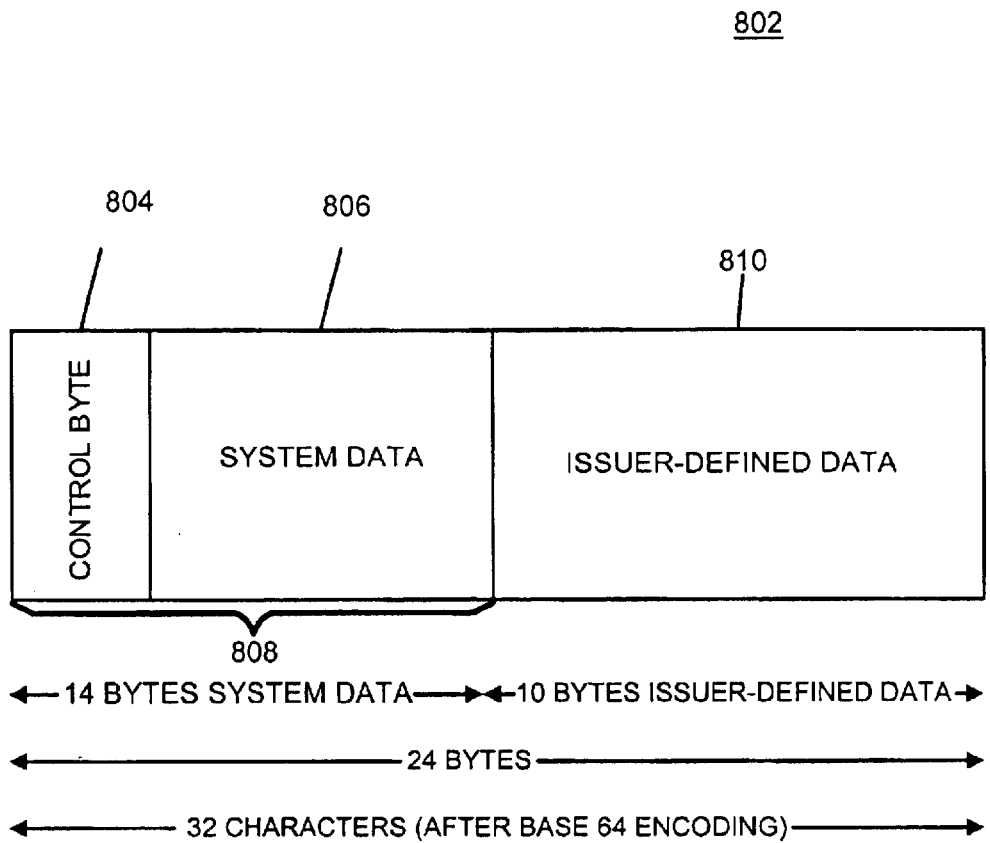
FIG. 8 is a block diagram illustrating an exemplary account holder authentication value (AAV) in accordance with the present invention.

FIG. 8 illustrates an example of a data structure 802—referred to herein as an Account Holder Authentication Value (AAV)—which can be used as the authentication data 414 illustrated in FIG. 4. The AAV 802 comprises 24 bytes of binary data representing 32 Base-64-encoded characters. The first 14 bytes 808 can generally be referred to as system data, and include a control byte 804 and other system data 806. The remaining 10 bytes 810 of data are defined by the issuer 406. The control byte 804 provides information regarding the type of authorization being performed. For example, the control byte 804 has a hexadecimal value of "82" for an initial authorization or pre-authorization of account holder, and a value of "02" for subsequent authorizations of the account holder. Additional authentication approaches are assigned their own control byte values. For example, a biometrics-based authentication procedure would have its own value for the control byte 804. Table I describes the various portions of the AAV 802.

TABLE I

| # | Data Element | Length | Data Description |
|---|---|---|---|
| 1 | Control Byte 804 | 1 Byte | Value = hexadecimal "82" indicates initial AAV<br>Value = hexadecimal "02" indicates subsequent AAV |
| 2 | Sale Amount | 2 Bytes | Consists of the left-most 4 decimal digits of the 12-digit sale amount with up to eight leading zeroes deleted. For example if the 12-digit transaction amount presented by the merchant consists of 000008765432, the four digits are 8765. |
| 3 | Sale Amount Truncation Field | 4 Bits | The above process for filling in the Sale Amount data can exclude some of the right-most digits of the original 12-digit amount. This field indicates how many such digits are so excluded. For example, if the 12-digit transaction amount consists of 000008765432, so that the four selected digits are 8765, then the three right-most digits of "432" would be excluded. In this case the Truncation Field would contain the value "3". |
| 4 | Transaction Currency Code | 12 Bits | Consists of the 3 decimal digit ISO 4217 currency code as included by the merchant in its payment page through a hidden field. Convert the three decimal digit Currency Code to binary, right-justify the resulting 10 bits in a 12 bit field, padded to the left with binary "00". |
| 5 | SHA-1 hash of Merchant Name | 7 Bytes | Consists of the left-most 7 bytes of the SHA-1 hash of the Merchant Name included by the merchant in the hidden field on its payment page. Merchant Name can first be edited as discussed below. |
| 6 | Merchant Transaction Stamp (MTS) | 2 Bytes | A number generated by the merchant. If this hidden field has a hexadecimal value of "00 00," this indicates that a random number has not been generated. |
| 7 | Issuer-defined Data 810 | 10 Bytes | Contains issuer-generated account holder authentication data. Preferably these data uniquely relate the transaction to the account holder. |

As is indicated in Table I, data element no. 1, a/k/a the control byte 804, is set to hexadecimal "82" for all AAVs associated with initial authorizations, including pre-authorizations. Elements 2–6 are the system data 806, which are transaction-specific details provided by the merchant's Web site. Element number 7 comprises the issuer-defined data 810. This element contains data that links the account holder to the particular transaction.

The system data 806 and the issuer-defined data 810 of the AAV 802 are generated and linked to a particular payment account by an AAV-generation processor 440 operated by the issuer 406. Upon receiving a request 412 for authentication of an account holder's identity, the AAV-generation processor 440 generates the system data 806 and the issuer-defined data 810 in binary format. The two sets of data 806 and 810, as well as the control byte 804, are combined to form a 24-byte binary version of the 802. Base 64 encoding of the 24-byte binary version produces a 32-character, Base 64 version of the AAV 802.

The system data 806 are created based on the control byte 804 and on information supplied from the merchant's confirmation page. The data 806 are generated using the following procedure:

1. A control byte 804 is created for the AAV 802. The control byte 804 can be, for example, a binary-coded decimal representation of the hexadecimal value "82."
2. The Sale Amount is created by the following steps:
   a) Up to 8 leading zeros are deleted from the Sale Amount
   b) The first four remaining Sale Amount digits are placed in the Sale Amount field as 4 binary coded digits.
3. The number of right-most digits of the Sale Amount that were excluded in Step 2b is determined. This number, which is a single, binary-coded decimal digit, is placed in the Sale Amount Truncation Field.
4. The 3-digit decimal Currency Code is converted to binary, and the resulting 10 bits are right-justified in a 12 bit field and padded to the left with binary "00."
5. The Merchant Name, which is represented by a set of hexadecimal Unicode control values, is edited using the following rules, but only if the name is expressed as a Latin-1 character set. All other character sets require no editing.
   a) All Latin-1 control characters are deleted. These are Unicode characters in the hexadecimal range 0000 through 001F, and 007F through 009F.
   b) With the exception of "&" (hexadecimal 0026), "@" (hexadecimal 0040), "1/4" (hexadecimal 00BC), "1/2" (hexadecimal 008D), and "3/4 (hexadecimal 00BE), any remaining Latin-1 non-alphanumeric character is replaced with a space character (hexadecimal 0020). The Unicode non-control and non-alphanumeric characters are those in the sets 0021 through 002F, 003A through 0040, 005B through 0060, 007B through 007E, 00A0 through 00BF, 00D7, and 00F7.
   c) Any character in the General Punctuation character set (2000 through 206F) is replaced with a space character (0020).
   d) Any Latin-1 numeric digits (0030) through (0039) beyond the third such digit are deleted so as to include only the first three numeric digits in the Merchant Name.
   e) After completion of the prior steps (a) through (d), all consecutive space characters (0020) are replaced with a single space character (0020).
   f) After completion of all prior steps, all leading and trailing space characters are deleted.
6. An SHA-1 hash of the edited (or unedited) Merchant Name is created and used to fill data element no. 5 listed in Table I.
7. The MTS from the merchant's payment screen is inserted into the MTS field as a binary coded decimal.

The resulting 14-byte binary value is the system data 806 which will be combined with the issuer-defined data 810 and then Base 64 encoded to create the AAV 802.

The procedure used to generate the issuer-defined data 810 depends on which approach will ultimately be used to verify the AAV 802. For example, in a cryptographic approach, the issuer-defined data element 810 is generated by encrypting a number, text string, or other data selected by the issuer 406. For example, the data to be encrypted can be a concatenation of the merchant name, the transaction amount, the date, and the account number of the account being used to make the purchase. The data is encrypted using a secret key—discussed in further detail below—to generate a cryptographic Message Authentication Code (MAC). Preferably, the MAC is generated by an ISO-approved encryption algorithm. The MAC is incorporated into the issuer-defined data 810 which is combined with the system data element 804 and 806 to form the AAV 802. During authorization, the issuer 406 cryptographically verifies the issuer-defined data element 810 to verify its authenticity. The cryptographic approach is particularly beneficial for systems in which the AAV 802 is created by one facility and verified by a different facility, and the two facilities are not in real-time communication. For the cryptographic approach, the issuer-defined data 810 in the AAV 802 includes the data elements described in Table II.

TABLE II

| Data Type | Description |
| --- | --- |
| AAV Format Number | Indicates the format of the issuer-defined data 810. |
| AAV-Generation Processor Identifier | If this issuer uses multiple AAV-generation processors, this is an indication of which processor produced this AAV. |
| Key Identification Data | Used to identify the cryptographic key used by this AAV-generation processor to generate the AAV MAC. |
| Transaction Sequence Number | A unique number assigned to this AAV by this AAV-generation processor. It should not repeat during the longest expected life of any transaction. |
| Message Authentication Code (MAC) | A MAC generated using the above-identified key by the above-identified AAV-generation processor, and based on the transaction's account number and on the entire AAV up to the MAC field. It must use an ISO-approved MAC algorithm. |

Since the issuer-defined data 810 is limited to 10 binary bytes, it may be sufficient to include only a portion of each of the above data elements. Preferably, the data 810 include four bytes of the MAC, four bytes of the Transaction Sequence Number, one byte of the Key Identification Data, and one byte total from the combination of the AAV Format Indicator and the AAV-Generation Processor Identifier.

The MAC serves as a cryptographic check to detect fraudulent alteration. Both the AAV-generation processor 440 and the AAV-verification processor 442 used to verify the transaction have access to the secret cryptographic key used to generate the MAC.

The AAV-generation processor 440 performs the following steps for each transaction:

1. The following AAV data elements are created: AAV Format Number, AAV Generation Facility Identifier and Key Identification Data.
2. The Transaction Sequence Number used in the previous AAV is incremented by a predetermined amount selected by the issuer 406. One or more of the right-most bits of the incremented value are used as the AAV Transaction Sequence Number data element.
3. Using the key indicated by Key Identification Data, a MAC is created by concatenating and encrypting the following data: (1) the account number provided to the merchant, (2) the entire AAV excluding the MAC sub-field itself, and (3) any other issuer-selected data. The left-most portion of the cryptographically computed MAC is issued as the AAV MAC data element.

In the cryptographic approach, the AAV-verification processor 442 determines the secret cryptographic key used by the AAV-generation processor 440 to generate the MAC. Preferably, the two processors 440 and 442 share a secret, cryptographic Key-Generation Key from which many (hundreds, thousands, or even millions) of MAC-generation keys can be derived. The Key-Generation Key can be used for years, whereas the MAC-Generation Key is preferably changed relatively frequently, depending upon the requirements of the MAC-generation algorithm and the issuer's key-management policy. In any case, however, the Key-Generation Key should be changed if there is any suspicion that it has been compromised.

The shared Key-Generation Key can, for example, be created by the AAV-verification processor 442 and conveyed to the AAV-generation processor 440 as one or more key components, using multiple control (preferably triple control) and split knowledge. The generation and distribution of cryptographic keys should conform to ISO security standards. Similarly, the mechanism by which a MAC-Generation Key is derived from a Key-Generation Key should also conform to ISO security standards. Furthermore, any cryptographic key stored within a storage medium connected to an AAV-generation processor 440 or an AAV-verification processor 442 preferably resides solely within physically secure hardware that protects the key against physical compromise in accordance with ISO standards.

If an AAV-verification processor receives AAVs from more than one AAV-generation processor, then any cryptographic key that the verification processor shares with one AAV-generation processor should not be related to any key it shares with another AAV-generation processor.

The following is an example of cryptographic generation of an AAV for an initial transaction:

Initial Authorization Transaction Example Data:

Control Byte Value: 82
Sale Amount: $87654.32
Currency Code: 840
Merchant Name (Unicode representation of SPA Merchant, Inc.):
0053 0050 0041 0020 004D 0065 0072 0063 0068 0061 006E 0074 002C 0020 0049 006E 0063 002E
MTS: FOB
Issuer-defined data: 55390900400486471234
SHA-1 hash of merchant name (after editing as described above) =
31 98 BE 30 1F BD 74 0F E2 AD 7E D2 ED 82 9E 69 06 EC E3 6F Would Result in 24 binary byte Source:
82 87 65 38 40 31 98 BE 30 1F BD 74 F0 AB 55 39 09 00 40 04 86 47 12 34
Converts to 32 character Base 64 encoded string:
godIOEAxmL4wH7108KtVOQkAQASHRxI0
The details for this example are as follows:

```
Map:      AAAAAAAABBBBBBBBBBBBBBBBCCCCDDDDDDDDDDDD
Source:     0   2   8   7   6   5   3   8   4   0
Binary:   100000101000011101100101001110000100000
6-Bit:
word:        00    40    29    37    14    04
Base64:       A     o     d     1     O     E Map:      EEEEEEEEEEEEEEEEEEEEEEEEEEEEEEEEEEEEEEEEEEEEEEEEFFFFFFFFFFFFFFFF
Source:     3   1   9   8   B   E   3   0   1   F   B   D   7   4   F   0   A   B
Binary:   0011000110011000101111000110000000111111011110101110100111100001010101011
6-Bit:
word:       00    49    38    11    56    48    07    59    53    52    60    10
Base64:   A     x     m     L     4     w     H     7     1     0     8     K Map:      GGGGGGGGGGGGGGGGGGGGGGGGGGGGGGGGGGGGGGGG
Source:     5   5   3   9   0   9   0   0   4   0
Binary:   0101010100111001000010010000000001000000
6-Bit:
word:       45    21    14    16    36    00    16
Base64:   t     V     O     Q     k     A     Q Map:      GGGGGGGGCGGGGGGGGGGGGGGGGGGGGGGGGGGGGGGG
Source:     0   4   8   6   4   7   1   2   3   4
Binary:   000001001000011001000111000100100011010 0
6-Bit:
word:       00    18    07    17    49    08    52
Base64:   A     S     H     R     x     I     0

Result:
24 byte Source: 82 87 65 38 40 31 98 BE 30 1F BD 74 F0 AB 55 39 09 00 40 04 86 47
12 34
Converts to 32 character Base 64 encoded string: godIOEAxmL4wH7108KtVOQkAQASHRxI0
```

The following is an example of cryptographic generation of an AAV for a subsequest transaction:
Subsequent Transaction Example Data:
Control Byte Value: 82
Sale Amount: $87654.32
Currency Code: 840
Merchant Name (Unicode representation of SPA Merchant, Inc.): 0053 0050 0041 0020 004D 0065 0072 0063 0068 0061 006E 0074 002C 0020 0049 006E 0063 002E
MTS: FOAB
Issuer-defined data: 55390900400486471234
SHA-1 hash of merchant name (after editing as described above)=31 98 BE 30 1F BD 74 0F E2 AD 7E D2 ED 82 9E 69 06 EC E3 6F
Would Result in 24 binary byte Source: 02 87 65 38 40 31 98 BE 30 1F BD 74 F0 AB 55 39 09 00 40 04 86 47 12 34
Converts to 32 character Base 64 encoded string:
A o d I O E A x m L 4 w H 7 1 0 8 K t V O k A Q A S H R I 0

The details for this example are as follows:

```
Map:     AAAAAAAABBBBBBBBBBBBBBBBCCCCDDDDDDDDDDDD
Source:     8    2    8    7    6    5    3    8    4    0
Binary:  100000101000011101100101001110000100000
6-Bit
word:      32      40    29      37         14     04
Base64:     g      o      d      l          O      E Map:     EEEEEEEEEEEEEEEEEEEEEEEEEEEEEEEEEEEEEEEEEEEEEEEEEEEEFFFFFFFFFFFFFFFF
Source:    3    1    9    8    B    E    3    0    1    F    B    D    7    4    F    0    A    B
Binary:  001100011001100010111110001100000001111111011110101110100111100001010111
6-Bit:
word:      00    49    38    11    56    48    07    59    53    52    60    10
Base64:     A     x     m     L     4     w     H     7     1     0     8     K Map:     GGGGGGGGGGGGGGGGGGGGGGGGGGGGGGGGGGGGGGGG
Source:     5    5    3    9    0    9    0    0    4    0
Binary:  0101010100111001000010010000000001000000
6-Bit:
word:      45    21    14    16    36    00    16
Base64:     t     V     O     Q     k     A     Q Map:     GGGGGGGGGGGGGGGGGGGGGGGGGGGGGGGGGGGGGGGG
Source:     0    4    8    6    4    7    1    2    3    4
Binary:  0000010010000110010001110001001000110100
6-Bit:
word:      00    18    07    17    49    08    52
Base64:     A     S     H     R     x     I     0

Result:
24 byte
Source:
82 87 65
38 40 31
98 BE 30
1F BD 74
F0 AB 55
39 09 00
40 04 86
47 12 34
Converts
to 32
charac-
ter Base
64
encoded
string:
godlOEAxmL4wH7108KtVOQkAQASHRxI0

Map Legend:
A—Control Byte value represented as Binary Coded Decimal (BCD)
B—Sale Amount—4 most significant digits represented as BCD
C—Sale Amount Truncation Field—single digit represented as BCD
D—Currency Code—3 digits represented as binary
E—SHA-1 hash of Merchant Name—First 7 bytes of SHA-1 hash value
F—MTS-2 byte value
G—Issuer-defined Data—10 bytes of issuer-defined data represented as BCD
```

A comparative approach is preferred for systems in which the AAV creation and verification facilities are in real-time communication with each other—e.g., via a common data storage system. In the comparative approach, the issuer-defined data 810 are generated using a random number or any other algorithm selected by the issuer 406. The resulting value 810 is combined with the system data 806 to form the AAV 802. The AAV 802 is then saved to a common database that is used by the AAV-verification processor 442 to verify transaction authenticity. During verification, the issuer 406 verifies the authenticity of a transaction by comparing the AAV received in the authorization request 420 to the AAV stored in the database.

The AAV for the comparative approach is generated and stored according to the following procedure:

1. Generate the issuer-defined data 810 in accordance with the issuer's definition—e.g., by a random number generator.

2. The issuer-defined data 810 are stored in a database linking them at least to a particular Account Number.

3. The merchant hidden field data are stored in a database linking them at least to the issuer-defined data 810.

4. The database is made available to the AAV-verification processor 442.

5. The issuer-defined data component 810 is combined with the system data component 808 to form a 24-byte binary value. The 24-byte binary value is Base 64 encoded to generate the 32 character 702.

Figure 1:
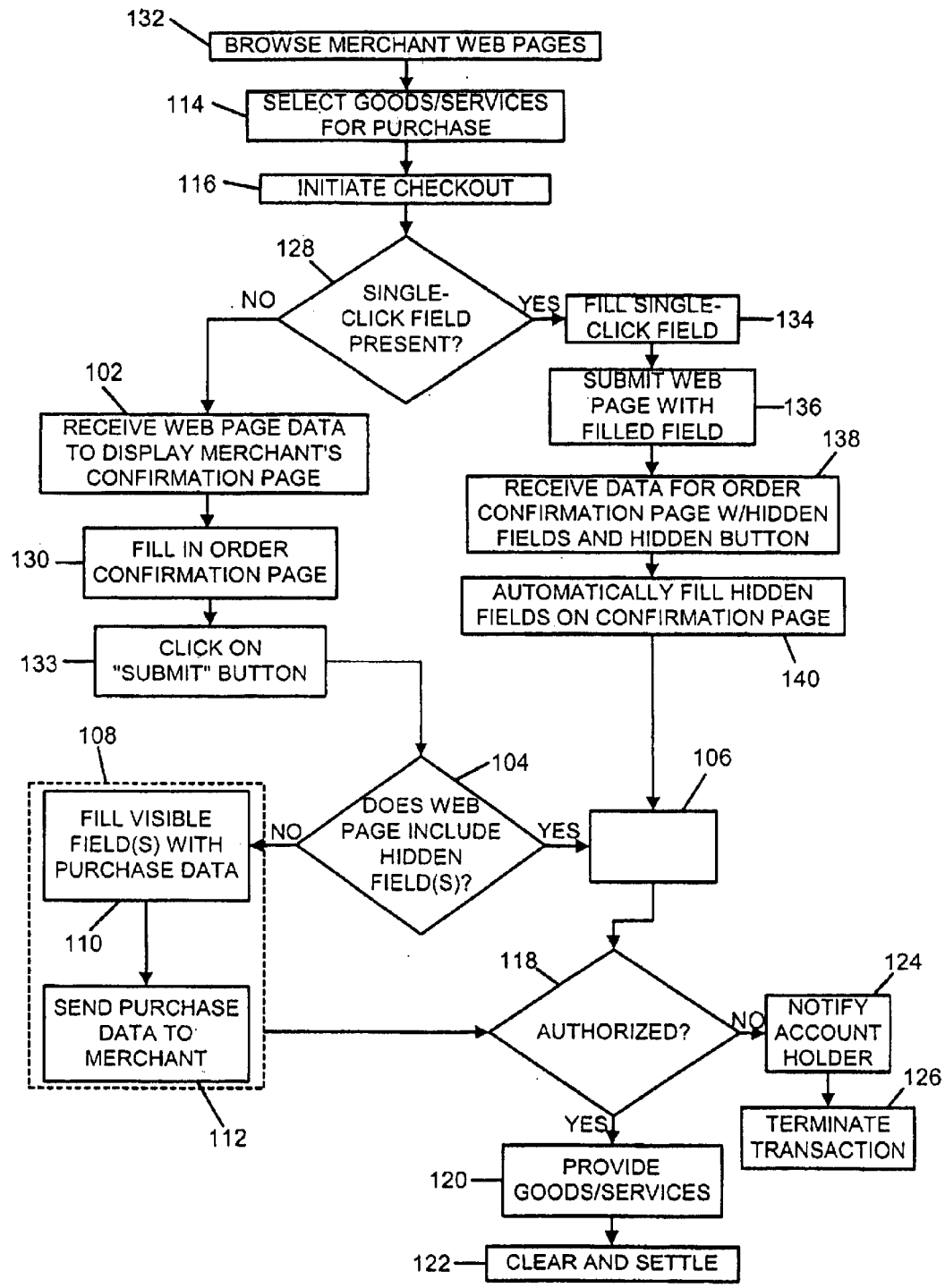
FIG. 1 is a flow diagram illustrating an exemplary procedure for conducting a payment transaction in accordance with the present invention.

FIG. 1 illustrates an exemplary procedure for operating the payment transaction system illustrated in FIG. 4 using authentication data 414 which includes the AAV 802 described above. In the illustrated procedure, the account holder browses the various pages of a Web site available on a server 448 operated by the merchant 404 (step 132). The purchase finds and selects goods and/or services that (s)he would like to purchase from the merchant 404 (step 114). Once the goods and/or services have been selected, the account holder initiates the merchant's checkout procedure (step 116). For example, in the commonly used "shopping cart" method, a shopper selects goods and/or services to be placed in a virtual shopping cart—i.e., a list of items that the shopper tentatively plans to purchase. Once the list of items is completed to the satisfaction of the shopper, the shopper initiates checkout by clicking on a visible "checkout" button on the merchant's Web page, at which point the checkout procedure begins with respect to the items in the shopping cart. Another possible method employs a single-click checkout procedure in which the merchant 404 stores account holder information and then uses the information for multiple transactions. The stored information can include the account holder's billing and shipping addresses, e-mail address, account number, and account expiration date. The account holder can then immediately initiate checkout with respect to an item (step 116) by clicking on a visible "purchase" button associate with the item.

In accordance with standards promulgated by the issuer 406, if the merchant's Web site is configured to enable single-click purchasing, each of the merchant's web pages on which single-click purchasing is offered includes a particular hidden field which can be referred to as the "UCAF Enabled Indicator" field, and is described in further detail below. The presence of this hidden field on a Web page notifies the user software that the Web page is configured for single-click shopping.

Once the checkout phase has been initiated (Step 116), if the UCAF Enabled Indicator field is not present on the Web page (step 128), the user software 402 requests and receives additional Web page data 410 from the merchant 404 through a portion 426 of a network 434 (step 102). The network 434 can, for example, be the Internet. The Web page data is used to display a "checkout" Web page (a/k/a an "order confirmation" Web page) on the account holder's computer screen. The account holder and/or user software 402 provides billing address, shipping address and/or payment account details to the merchant 404 by entering some or all of this information into fields on the confirmation page (step 130). The billing and shipping address information can be entered manually by the account holder, filled in automatically by the user software 402, or filled in automatically by the merchant's server based on information stored in the merchant's server for the particular account holder. To confirm the order, the account holder clicks a visible "submit" button on the confirmation page (step 132). If the Web site of the merchant 404 is configured to operate using the authentication data 414 discussed above, the merchant's order confirmation page will contain one or more hidden fields, including: (1) hidden fields for delivering information to the user software 402; and (2) hidden fields for receiving information such as an AAV from the user software 402. The hidden fields, which are collectively referred to herein as the "Universal Cardholder Authentication Field" (UCAF), are described in further detail below. Through the UCAF on the confirmation page, the user software 402 receives some or all of the following information:

TABLE III

| Data Type | Definition |
|---|---|
| Merchant Name | The merchant provides its name in a hidden field that is 88 characters in length. These 88 hexadecimal characters (0–9, A–F) consist of 22 sets of 4 hexadecimal digits. Each set corresponds to a control character in the Unicode character set table (www.unicode.org). |

TABLE III-continued

| Data Type | Definition |
|---|---|
| Card Acceptor City | The merchant provides its Card Acceptor City in a hidden field which is 13 characters in length. |
| Card Acceptor State/Country Code | The merchant provides its Card Acceptor State or Country code (if not US) in a hidden field that is 3 characters in length. If Country Code, the 3 character, alphabetic country code is supplied. |
| Currency Code | This is the 3-digit ISO 4217 currency code associated with the currency in which the purchase is being transacted. |
| Sale Amount | This represents the amount of the sale as mutually agreed upon by the merchant and the account holder and reflects the amount presented to the account holder during the checkout process. This amount may differ than the actual authorization amount due to processing issues such as split payments, split shipments, currency conversion, etc. Sale Amount displayed by the SPA wallet uses the currency format indicated by the Currency Code. |
| Merchant Transaction Stamp | An optional two-byte number included at the merchant's discretion. This field, if included, is a value generated by the merchant between 00 01 and FF FF inclusive. If not included, the hidden field is still present but is filled with the value of 00 00. |
| UCAF Authentication Data Field | This is a blank hidden field that merchant presents in order to collect authentication data. This field is filled by the user software 402. |
| Account Number | A hidden field that the merchant uses to provide up to 5 digits of the stored account number registered with the merchant and expected to be used to process the transaction with all remaining digits masked or not provided. The account number contained in this field can be overwritten by issuers or account holders to ensure the account number provided is directly associated with any authentication data generated and populated in the UCAF Authentication Data field such as an AAV. |
| Expiration Month | A blank hidden field that is populated by an issuer or account holder with the month the payment card number expires. |
| Expiration Year | A blank hidden field that is populated by an issuer or account holder with the year the payment card number expires. |
| CVC2 | A blank hidden field that is populated by an issuer or account holder with the CVC2 linked to the payment card number. |
| UCAF Brand | A hidden field that is populated by the merchant to denote specific payment brands accepted for on-line payments. For example, the UCAF Brand field can have the value of "01" for Brand A and "02" for Brand B. |
| UCAF Enabled Indicator | A blank hidden field used by single-click merchants. This hidden field mimics the function of an Order Confirmation Page and enables the user software 402 to automatically activate and to supply account holder payment details to the merchant payment pages. |
| AAV Submit | A hidden, virtual button that the user software 402 automatically clicks after form fill is completed at a single-click merchant. By clicking this button, the user software 402 sends the AAV data 802 to the merchant 404. |
| Cardholder Confirmation | This is a hidden field that the merchant presents on the receipt page to notify the issuer 406 that the account holder submitted the transaction. This field is filled by the merchant 404 with a value of "1" to indicate the transaction has been submitted. |

Exemplary values of these hidden fields included within the merchant's Order Confirmation Page are provided below. The exemplary values are based on the following transaction details:
Merchant Name: SPA Merchant, Inc.
Merchant Location: Purchase, N.Y.
Transaction Amount: $87654.32 USD
Fields Populated by Merchants:
<INPUTtype="HIDDEN"name="Ucaf_Merchant_Name"value="0053005000410020004D0065007200630068006100 6E0074002C00200049006E0063002E">

```
<INPUT type="HIDDEN" name="Ucaf_City"value=
"Purchase">
<INPUT type="HIDDEN" name="Ucaf_State_Country"
value="NY">
<INPUT type="HIDDEN" name="Ucaf_Currency_Code"
value="840">
<INPUT type="HIDDEN" name="Ucaf_Sale_Amount"
value=000087654321">
<INPUT type="HIDDEN" name="Ucaf_MTS" value=
"F0AB">
<INPUT type="HIDDEN" name="Ucaf_Brand" value=
"01"
```

Fields Populated by Issuer Server

```
<INPUTtype="HIDDEN"name="Ucaf_Authentication_
D a t a " v a l u e =
"godlOEAxmL4wH7108KtVOQkAQASHRxl0">
<INPUTtype="HIDDEN"name="Ucaf_Payment_Card_
Number"value="1234567899874563">
<INPUTtype="HIDDEN"name="Ucaf_Payment_Card_
ExpDate_Month"value="02">
<INPUTtype="HIDDEN"name="Ucaf_Payment_Card_
ExpDate_Year"value="2004>
<INPUTtype="HIDDEN"name="Ucaf_Payment_Card_
CVC2"value="256">
```

For merchants who wish to receive recurring payments from a particular account holder, the following information is collected within the UCAF structure:

Transaction Frequency—indicates the frequency of recurring payments. The valid values that can be assigned by a merchant are "W" for weekly, "M" for monthly, and "Q" for quarterly or "A" for annually.

Number of Payments—in order to determine the total number of recurring payments between an account holder and merchant. This field preferably does not have a default maximum limit. Each Brand that utilizes this recurring payment function may set its own implementation limits. For example, a suitable maximum number of payments is 260.

First Payment—this field conveys whether the account holder acknowledges entering a recurring payment relationship and the date expressed as DDMMYYYY of the first recurring payment.

Merchant Cancellation Policy—this field notes whether the account holder can cancel the recurring payments. Value is either "1" for Yes or "0" for No.

The recurring payment elements can optionally be combined into a single hidden field defined for UCAF. This additional hidden field is named Ucaf_Recur_Payment, and includes the following portions:

"F NNN DDMMYYYY C", where

F—is the frequency of the recurring payment. Valid values are: W—weekly, M—monthly, Q—quarterly, A—annually NNN—is the number of recurring payments.

DDMMYYYY—is the date of the first recurring payment. For example Mar. 29, 2002 is expressed as "29032002."

C—is the merchant cancellation policy. This denotes whether the cardholder can cancel the recurring payment. Valid values are "1" for yes and "0" for no.

For example, if the merchant 404 supports recurring payments that are established as monthly for 1 year with the first payment on Mar. 1, 2001, and if the account holder is permitted to cancel transactions, then the value of Ucaf_Recur_Payment would be "M 12 01032001 1". This approach eliminates the need for the merchant 404 to repeatedly fill multiple hidden fields for recurring payments, because the information is consolidated into a single hidden field.

The merchant 404 can optionally include a Merchant Transaction Stamp (MTS) in one of the hidden fields on the merchant's payment page. The MTS is unique to each transaction and can therefore be used as an added form of security. In particular, the MTS can be used to show that the account holder has actually visited the merchant's Web site, thereby providing evidence that the transaction is legitimate and not a retransmission by a fraudulent merchant or other party posing as an authentic merchant.

For transactions other than single-click purchases, the order confirmation page also includes visible fields for displaying to the account holder information such as the Merchant Name and Sale Amount. The fact that the merchant's name and the transaction amount are visible on the confirmation page before the shopper clicks the confirmation button (step 210 discussed below with respect to FIG. 2) provides additional evidence that the account holder has indeed confirmed and accepted the transaction. This feature helps the issuer 406 to challenge any repudiation of the transaction by the account holder.

Referring again to FIG. 1, if the order confirmation Web page of the merchant 404 includes the above-described hidden fields (step 104), then the purchase is made using an authorization procedure 106 which utilizes the aforementioned technique of sending authentication data 414 in a loop from the issuer 406, to the user software 402, to the merchant 404, to the payment organization 408, and back to the issuer 406. On the other hand, if the order confirmation Web page does not include the hidden fields (step 104), then the user software 402 performs a conventional payment procedure 108 which includes filling visible fields of the Web page with purchase data such as a credit card number, expiration date, etc. (step 110), and using the filled Web page fields to send the purchase data to the merchant 404 for authorization (step 112).

If, in step 128, the UCAF Enabled Indicator field is present on a Web page on which the account holder has clicked a "purchase" button, then the user software 402 fills the UCAF Enabled Indicator field with a code (e.g., "01") notifying the merchant 404 that the account holder is using UCAF-enabled user software 402 for performing the payment transaction (step 134). The Web page with the filled UCAF Enabled Indicator field is submitted to the merchant 404 (step 136). The merchant 404 sends confirmation page data to the user software 402 (step 138). However, the purchaser only sees a page or window with a simple message such as, e.g., "Order Being Processed." While this message is being displayed, the user software 402 automatically fills various hidden fields on the confirmation page with the account holder's address information and account number (step 140). Authentication procedure 106 is then performed.

In any case, if authorization is granted by authorization procedure 106 or authorization procedure 108 (step 118), the good and/or services are shipped, delivered, or otherwise provided to the purchaser (step 120). Any conventional clearing and settlement procedure can be used to clear and settle payment between the issuer 406 and the payment organization 408 (step 122). If the merchant 404 has an account with an acquirer (item 514 in FIG. 5, discussed below), payment is cleared and settled between the issuer 406 and the acquirer 514 (step 122).

On the other hand, if authorization is denied (step 118), then the account holder is notified of the denial (step 124), and the transaction is terminated (step 126).

Figure 2:
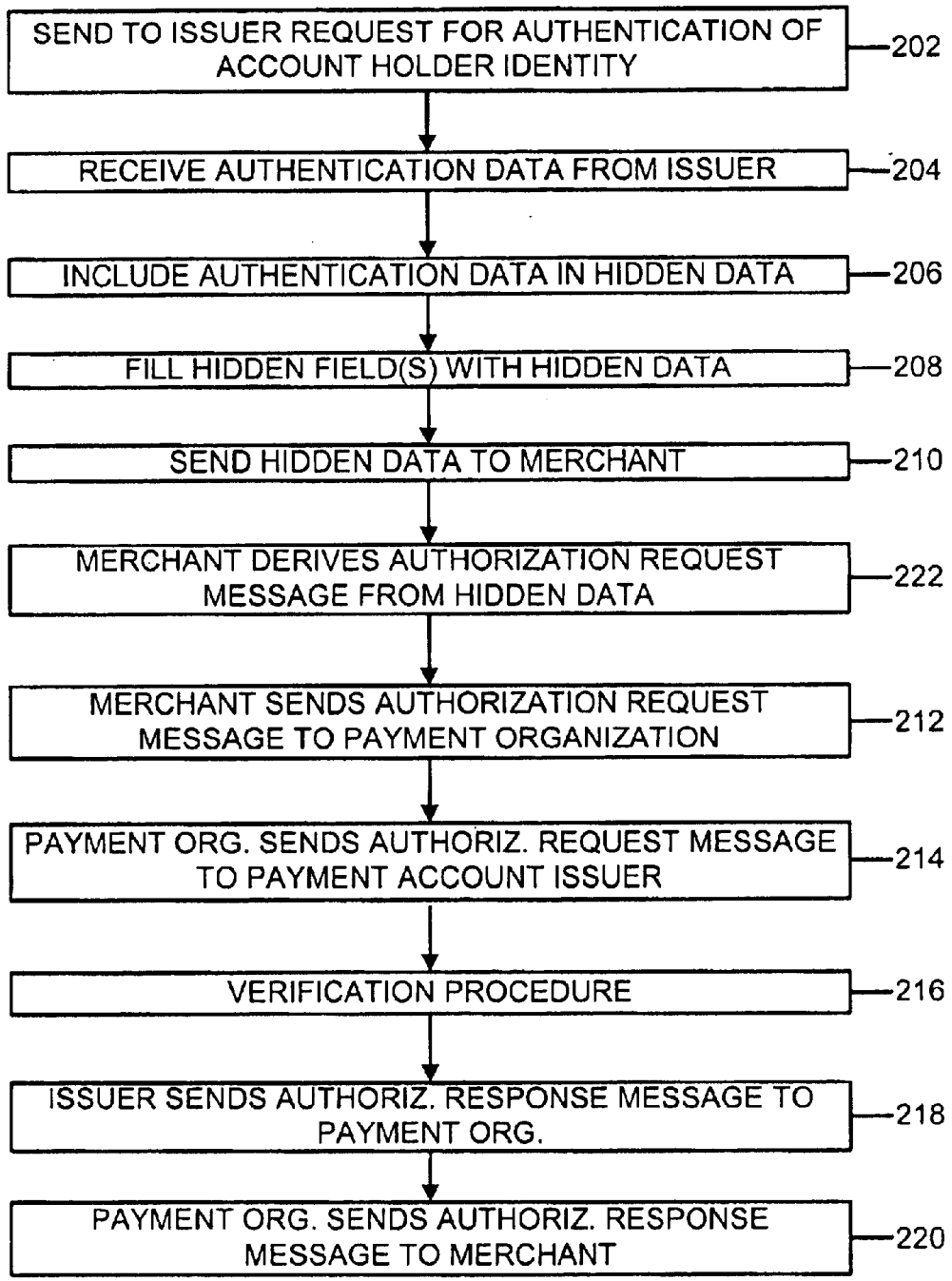
FIG. 2 is a flow diagram illustrating an exemplary payment procedure for use in the procedure illustrated in FIG. 1.

An example of a procedure 106 for using the authentication data 414 to authorize a transaction is illustrated in FIG. 2. Incorporating the information received from the hidden fields in the merchant's order confirmation page and/or provided by the account holder, the user software 402 sends to the issuer 406 a request 412 for authentication of the identity of the account holder (step 202). The request 412 is sent through a portion 428 of the network 434. In response to the request 412 for authentication of the account holder identity, the issuer 406 sends authentication data 414 such as an AAV to the user software 402 through the network portion 428. Once the user software 402 has received the authentication data 414 from the issuer 406 (step 204), the software 402 includes the authentication data 414 in hidden data 416 (step 206) and uses the hidden data 416 to fill the hidden fields on the Web page of the merchant 404 (step 208). For example, the AAV can be entered into a hidden Authentication Data field on the confirmation page.

Preferably, each account holder is authenticated for each transaction. If the identity of the account holder is not successfully authenticated, the account holder is notified of this failure. If the identity of the account holder has been confirmed, the issuer's AAV-generation processor 440 generates an AAV 802. The issuer 406 then includes the AAV 802 in the authentication data 414 and sends the data 414 to the user software 402.

Other information entered into hidden fields on the confirmation page by the user software 402 include the account holder's payment account details such his/her account number, expiration date and, optionally, the card validation check (CVC2) value. In addition, the hidden fields preferably include the above-described UCAF Enabled Indicator field. Optionally, the user software 402 can identify any difference between the account number supplied by the merchant (if the account holder was profiled) and the account number inserted into the hidden Account Number field. The user software 402 can alert the account holder of any difference and request confirmation. In some cases, an account holder may have multiple accounts registered with the issuer 406. In such cases, the account holder selects which account number is to be used for payment.

Once the hidden fields of the confirmation Web page have been filled, the page contains hidden data 416, including the authentication data 414 (which itself includes the AAV 802), the payment account information, and any other relevant information. The confirmation page is submitted to the merchant 404 by clicking a "submit" button on the page (step 210). If this is, e.g., a shopping cart type transaction, the submit button is visible to the account holder, and is clicked by the account holder. However, for single-click transactions, the submit button is hidden, and is automatically clicked by the user software 402.

The merchant 404 receives the hidden data 416 on the confirmation page, and validates the Control Byte 804 and the hash of the Merchant Name contained in the AAV 802. Optionally, the merchant 402 can also verify the Merchant Transaction Stamp (if generated by the merchant) and Sale Amount.

The merchant 404 preferably captures and retains the AAV for future use in linking the account holder to a specific transaction. The data can also be used for performing subsequent authorizations of split-shipments, and may be of value to the merchant 404 during exception processing.

In order to ensure the merchant 404 has not received a fraudulent AAV 802, the control byte 804 is verified by confirming that its most significant bit is a "1." This can be done by verifying that the left-most character of the Base 64 encoded AAV 802 is a lower case "g."

The Merchant Name is verified by confirming that the hash of the Merchant Name, as included in the AAV, exactly matches the hash of the Merchant Name that was included in one of the hidden fields. To accomplish this, the merchant 404 verifies that characters 7 through 16 of the Base 64 encoded AAV 802 exactly match a pre-computed value. This pre-computed value can be obtained by performing the SHA-1 hash process of the Merchant Name.

For example an AAV may be:

godlOEAxmL4wH7108KtVOQkAQASHRxl0

The merchant verification process would parse out characters 7–16:

AxmL4wH710

The merchant 404 compares this value to the known SHA-1 hash of the Merchant Name. If the value is not successfully validated, the merchant 404 declines the transaction.

Optionally, the merchant 404 can also validate the AAV sale amount based on the sale amount presented in one of the hidden fields. The merchant 404 converts the Base 64 encoded AAV 802 to its 24 binary byte source and identifies the Sale Amount, Sale Amount Truncation Field and Transaction Currency Code. The merchant 404 validates the Sale Amount, Sale Amount Truncation Field and Transaction Currency Code in accordance with the data descriptions in Table I and the Sale Amount and Currency Code presented via hidden fields. If the values are not successfully validated, then the merchant 404 declines the transaction.

Optionally, the merchant 404 can also validate the MTS contained in the AAV 802. When validating the MTS, the merchant 404 identifies the MTS component of the AAV 802 and compares it to the MTS presented in the Order confirmation page hidden field. If the value is not successfully validated, the merchant 404 declines the transaction, because the AAV 802 is likely to be fraudulent.

The merchant 404 derives an authorization request message 418 from the hidden data 416 (step 222), and sends the authorization request message 418 to the payment organization 408 through an additional network or network portion 430 (step 212). Because the hidden data 416 includes the authentication data 414, the authorization request message 418 is ultimately derived from the authentication data 414.

The authorization request message 418 preferably includes at least the following data elements:

Account holder's Payment Account Number to be supplied to the merchant

Merchant Name

Currency Code

Sale Amount

Merchant Transaction Stamp (default value is set to hexadecimal "00 00" by the merchant 404 if this element is not being used)

Optionally, the following data elements can also be included:

Card Acceptor City

Card Acceptor State/Country

Because the hidden data 416 and authorization request message 418 contain sensitive, transaction-specific data and may be transmitted over a public network such as the Internet, the hidden data 416 and the authorization request message 418 are preferably protected using a secure encryption method—e.g., 128-bit SSL or equivalent—in order to prevent the data from being compromised.

The payment organization 408 sends an authorization request message 420 to the issuer 406 through yet another network or network portion 432 (step 214). The authorization request message 420 sent from the payment organization 408 to the issuer 406 is typically identical to, or derived from, the authorization request message 418 sent from the merchant 404 to the payment organization 408. The issuer 406 uses a verification procedure 216 to process the authorization request message 420, in order to generate an authorization response message 422.

Figure 6:
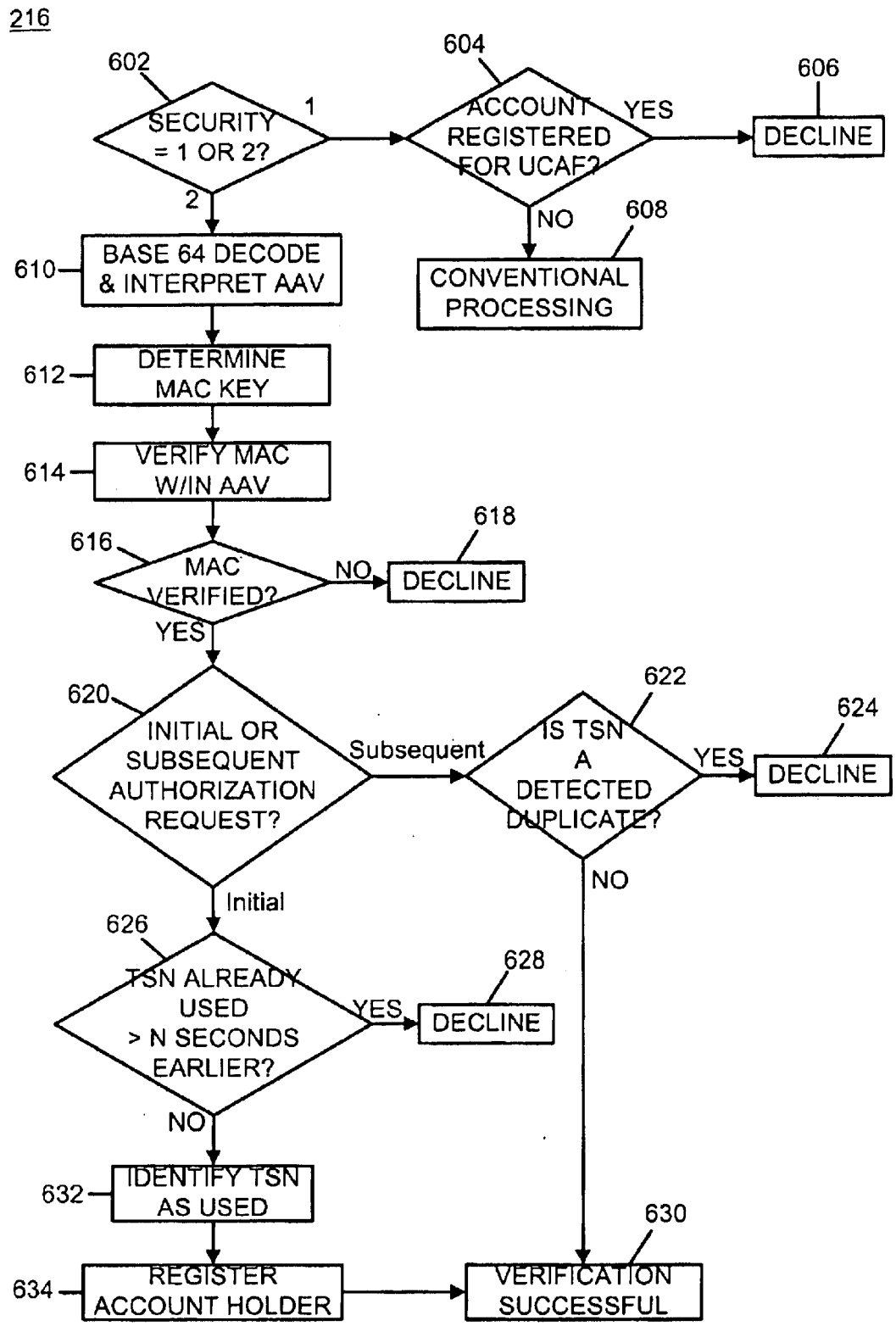
FIG. 6 is a flow diagram illustrating an exemplary authorization request message verification procedure for use in the procedures illustrated in FIGS. 2 and 3.

FIG. 6 illustrates an exemplary procedure 216 for use by an issuer 406 processing an authorization request message 420 to generate an authorization response message 422 such as is discussed above with respect to FIGS. 1 and 2. The exemplary procedure 216 illustrated in FIG. 6 employs a cryptographic verification approach suitable for use with the cryptographically generated AAV 802 described above. In the illustrated procedure 216, a cryptographic AAV-verification processor 442 operated by the issuer 406 performs the following steps for each authorization request message 420 received by the facility:

Security Level Routing:
1. If security level indicator is set to a value of 1 (step 602), the verification processor 442 verifies that the account number is registered for the UCAF-based verification system (step 604). If the account is registered (step 604), the processor 442 declines the transaction (step 606) because such a scenario indicates that: (i) the account holder did not use his/her UCAF-enabled software 402 to process the payment transaction; or (2) an unauthorized third party has initiated the transaction.
   a) If the account is not UCAF-registered (step 604), the authorization request is forwarded to an authorization system configured for conventional (i.e, non-UCAF based) payment processing (step 608).
2. If the security level indicator is set to 2 (step 602), the processor 442 proceeds with the AAV Verification process described below.

AAV Verification:
1. The AAV is extracted from the authorization request message, Base 64 decoded, and interpreted based on the indicated data format (step 610).
2. Using the AAV's Key Identification Data, its AAV-Generation Processor Indicator, and its Transaction Sequence Number, the verification processor 442 determines the cryptographic key to be used for MAC verification (step 612).
3. Using the appropriate MAC algorithm, the processor 442 attempts to verify the MAC within the AAV 802 (step 614). If the MAC is not successfully verified (step 616), the transaction is declined (step 618), because the AAV 802 is not valid and the transaction is therefore assumed to be fraudulent.
4. If the Control Byte of the AAV indicates that this is an initial authorization request (step 620):
   a) The processor 442 checks whether the same Transaction Sequence Number (from the AAV-generation processor 440) and Sale Amount has already occurred in a previous initial authorization that was received more than "n" seconds ago (where "n" is to be specified by the issuer, and typically equals 60) (step 626).
      i) Note: This optional delay of, e.g., 60 seconds, is to allow for the automatic retransmission of an authorization request message if the corresponding authorization response message has been lost.
   b) If the Transaction Sequence Number has already occurred in a previous authorization-request message that was received more than "n" seconds ago (step 626), then the transaction is declined; this Transaction Sequence Number from this AAV-generation processor 440 is a "detected duplicate" (step 628). The attempted transaction involves a fraudulent replay of a previously valid AAV.
   c) If the Transaction Sequence Number has not already occurred (step 626), then the AAV's Transaction Sequence Number is identified as "used" for future transactions (step 632).
   d) Optionally, after verifying the AAV 802 in this initial authorization request, the issuer 406 can check the registration status of the account holder and automatically register the account holder (step 634).
   e) The AAV is thus confirmed to be valid, and the transaction is therefore successfully verified (step 630). An indication of successful verification is included in the authorization response message 422.
5. If the AAV's Control Byte 804 indicates that this is a subsequent authorization request (step 620), and if the AAV's Transaction Sequence Number is a "detected duplicate" for the AAV-generation processor 440 being used (step 622), then the transaction is declined (step 624). This is a merchant-originated resubmission of an already replayed SPA transaction.
6. On the other hand, if the TSN is not a detected duplicate (step 622), then the AAV is valid, and the transaction is therefore successfully verified (step 630). An indication of successful verification is therefore included in the authorization response message 422.

To perform verification, the AAV-verification processor 442 of the issuer 406 preferably maintains a record of every account number that has been registered for performing UCAF-based authentication. In addition, the AAV-verification processor 442 stores the Key-Generation Key (or keys) that it shares with each AAV-generation processor 440. The verification processor 442 also stores records indicating which AAVs it has already received, in order to detect a fraudulent replay of an account number and its associated AAV.

Figure 7:
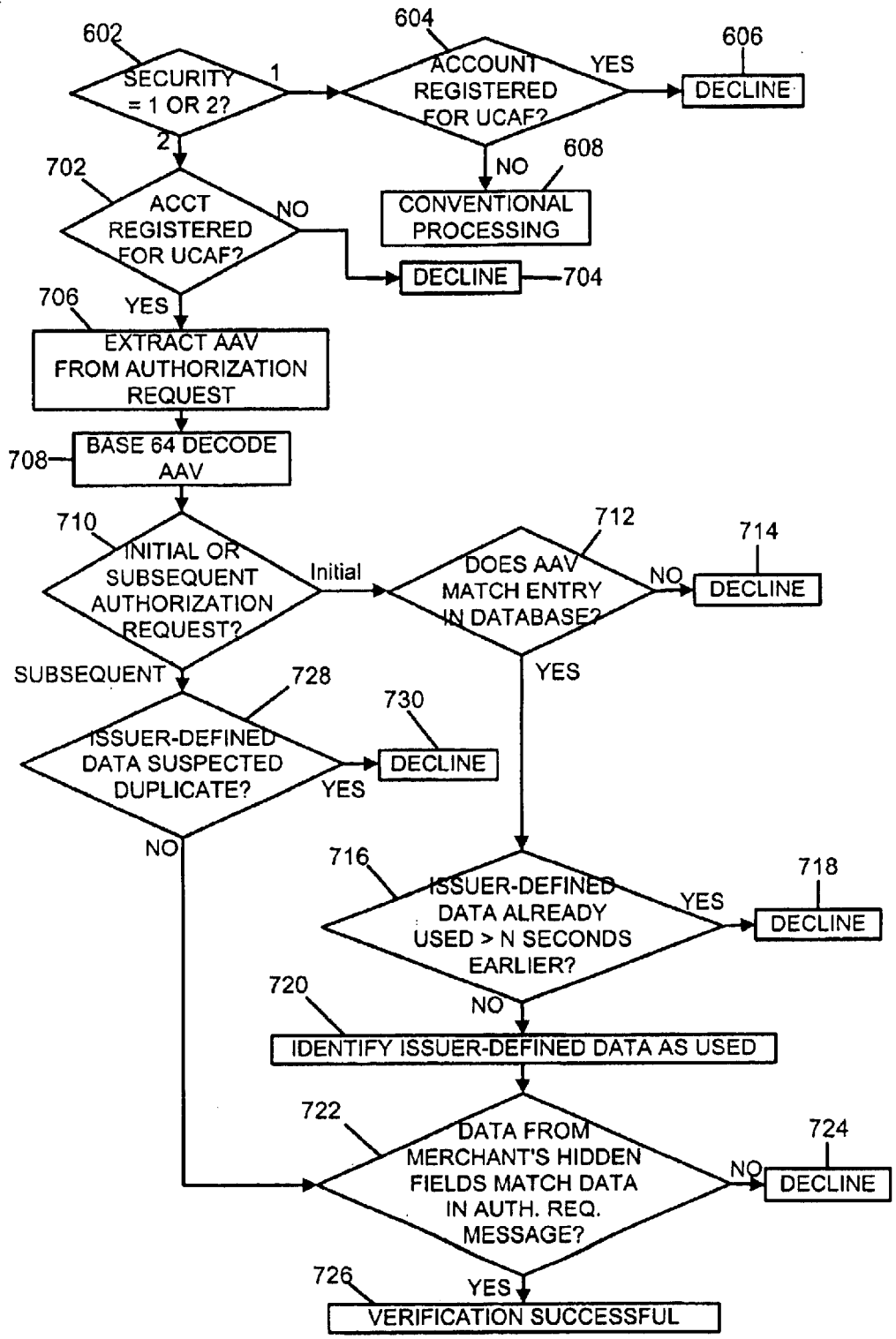
FIG. 7 is a flow diagram illustrating an additional exemplary authorization request message verification procedure for use in the procedures illustrated in FIGS. 2 and 3.

AAV verification can also be performed using a comparative approach. For example, in the verification procedure 216 illustrated in FIG. 7, the AAV-verification processor 442 performs the following steps for each authorization request message:

1. If security level indicator is set to "1" (step 602):
   a) The processor 442 determines whether the account number is registered for the UCAF-based system (step 604). If the account is registered (step 604), the transaction is declined (step 606), because such a scenario indicates that the account holder did not use his/her UCAF-enabled software 402 to process the payment transaction, or that an unauthorized third party initiated the transaction.
   b) If the account is not UCAF registered (step 604), the authorization request is forwarded to the issuer's authorization system for conventional (i.e., non-UCAF-based) payment processing (step 608).
2. If the security level indicator is set to "2" (step 602):
   a) The processor 442 determines whether the account number has been registered for the UCAF-based system (step 702). If so (step 702), the issuer 406 extracts the AAV from the authorization request (step 706) and continues with further processing, discussed below.
   b) If the account is not registered (step 702), the transaction is declined (step 704).

3. If the account is registered (step 702), then after step 706, the AAV 802 of the authorization request message is Base 64 decoded (step 708).
4. If the Control byte of the AAV indicates that this is an initial authorization request (step 710), the following AAV procedure is performed based on a comparison of AAV transaction information stored in the issuer's database with transaction data contained in the authorization request message 420:
   a) The processor 442 verifies that the AAV received in the authorization request matches an entry in the issuer's database (step 712). If there is no matching entry (step 712), the transaction is declined (step 714).
   b) If the AAV received is determined to be valid based on a positive match (step 712), the processor 442 verifies that the issuer-defined data 810 have not been received in a prior transaction. Optionally, if the issuer-defined data 810 have been received in a prior transaction more than "n" seconds ago (where "n" typically equals 60) (step 716), then the transaction is declined and the AAV 802 is labeled as a detected duplicate (step 718).
   c) If the issuer-defined data element has not been previously received (step 716) then the issuer-defined data 802 are labeled as "used" (step 720), and additional validation of the issuer-defined data 810 is performed (step 722).
   d) The additional data validation can include comparing data captured from the merchant hidden fields with data contained in the authorization request message 420 (step 722). This allows the issuer 406 to validate additional fields such as the Account Number and the Merchant Name. If the data are successfully validated (step 722), then the verification of the AAV 802 is successful (step 726). An indication of successful verification is therefore included in the authorization response message 422. If the data do not match (step 722), then the transaction is declined (step 724).
5. If the Control byte of the AAV indicates that this is a subsequent authorization request (step 710), the following steps are performed:
   a) If the issuer-defined data 810 are a "Suspected Duplicate" data set (step 728), the processor 442 declines the transaction (step 730).
   b) If the issuer-defined data 810 were received in an initial authorization and are not a "Suspected Duplicate" data set (step 728), then the processor 442 performs additional validation checks by comparing data captured from the merchant hidden fields with data contained in the authorization request message 420 (step 722). This allows the issuer 406 to validate the Account Number and Merchant Name. If the data match (step 722), then the verification is successful (step 726), and an indication of successful verification is therefore included in the authorization response message 422.

Regardless of whether a cryptographic or comparative verification approach is used to generate the authorization response message 422, the issuer 406 sends the authorization response message 422 to the payment organization 408 through network or network portion 432 (step 218). The payment organization 408 sends an authorization response message 424 to the merchant 404 through network or network portion 430 (step 220). The authorization response message 422 sent from the payment organization 408 to the merchant 404 is typically identical to, or derived from, the authorization response message 422 sent from the issuer 406 to the payment organization.

Optionally, the payment organization 408 can perform the verification procedure 216 on behalf of the issuer 406, in which case the payment organization 408 includes its own verification processor 446 which processes the authorization request message 418 to generate authorization message 424. In other words, the payment organization 408 can "stand in" for the issuer 406 in the role of processing authorization request messages to generate authorization response messages. Such "stand-in processing" can be especially beneficial if the issuer's authorization system is temporarily unavailable, because it eliminates the need to send an authorization request message 420 to the issuer 406 to be processed for generating an authorization response message 422; the authorization response message 422 from the issuer 406 is unnecessary.

In any case, regardless of whether the verification procedure 216 has been performed by the issuer 406 or the payment organization 408, if the authorization response message 424 received by the merchant 404 includes an approval of the transaction (step 118 of FIG. 1), the merchant 404 presents an HTML-based receipt page to the account holder in order to confirm completion of the transaction. This page preferably contains a reference number for use with customer inquiries. In addition, the receipt page hosts a hidden transaction identification field which is not visible to the account holder but which can be read by the user software 402 for the purpose of identifying completed transactions. The goods are then shipped and/or the services are provided (step 120). Any conventional clearing and settlement procedure can then be used to clear and settle the payment between the issuer 406 and the payment organization 408 (step 122).

Figure 5:
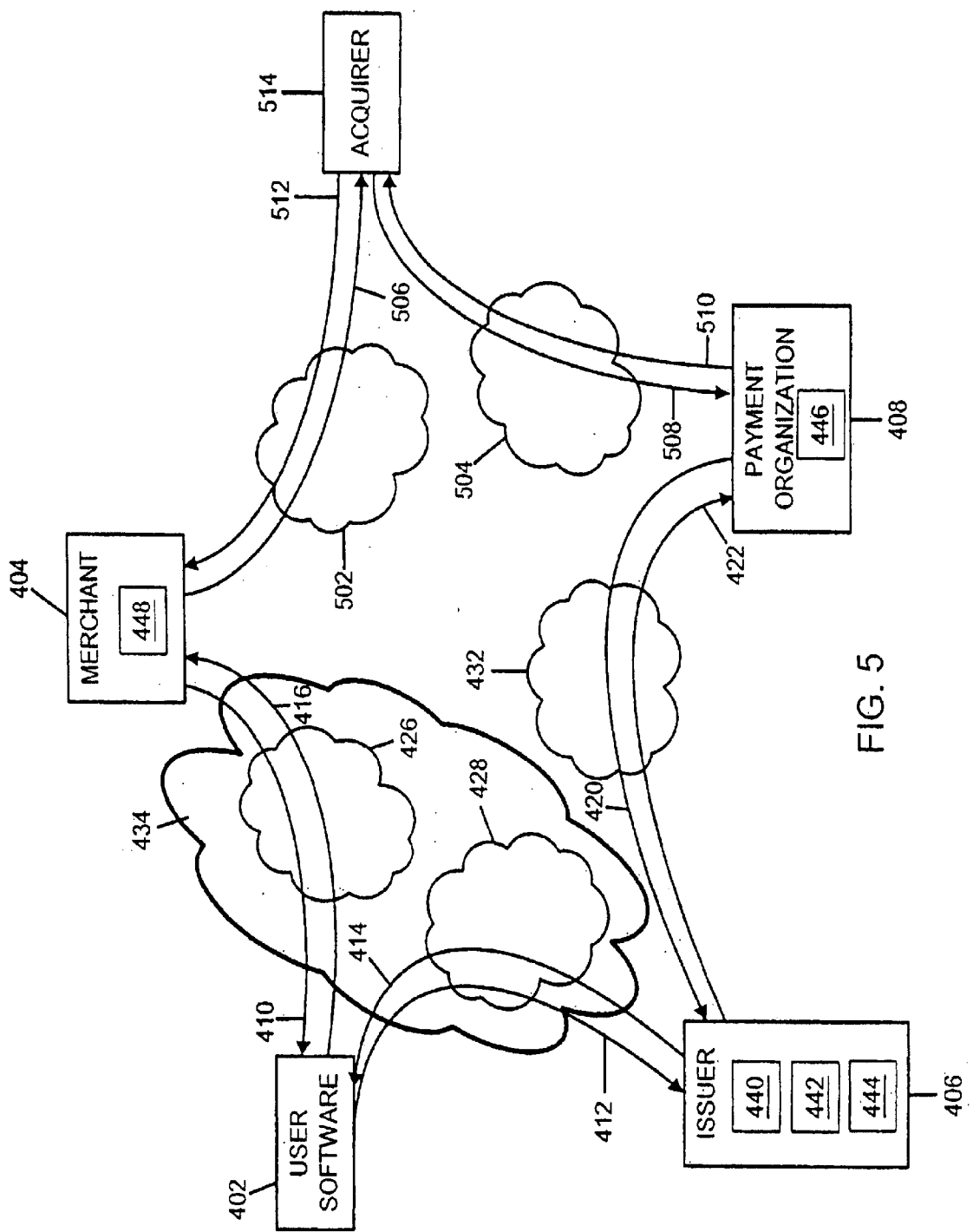
FIG. 5 is a block diagram illustrating an additional exemplary system for conducting a payment transaction in accordance with the present invention.

FIG. 5 illustrates an additional system for performing secure payment transactions in accordance with the present invention. Similarly to the system illustrated in FIG. 4, the system illustrated in FIG. 5 includes user software 402, a merchant 404, a payment organization 408, and a payment account issuer 406. However, the system illustrated in FIG. 5 also includes an acquirer 514. The acquirer 514 is typically an acquiring bank with which the merchant 404 has an account. Authentication data 414 is included in data which travels in a loop from the issuer 406, to the user software 402, to the merchant 404, to the acquirer 514, to the payment organization 408, and back to the issuer 406, whereupon the issuer confirms that the authentication data 414 have not been improperly altered or otherwise tampered with. Similarly to the system illustrated in FIG. 4., the system illustrated in FIG. 5 is operated in accordance with the procedure illustrated in FIG. 1. However, the payment procedure 106 used in conjunction with the system illustrated in FIG. 5 includes the acquirer 514 in the loop through which the authentication data 414 and the other data/messages travel, as is discussed in further detail below.

Figure 3:
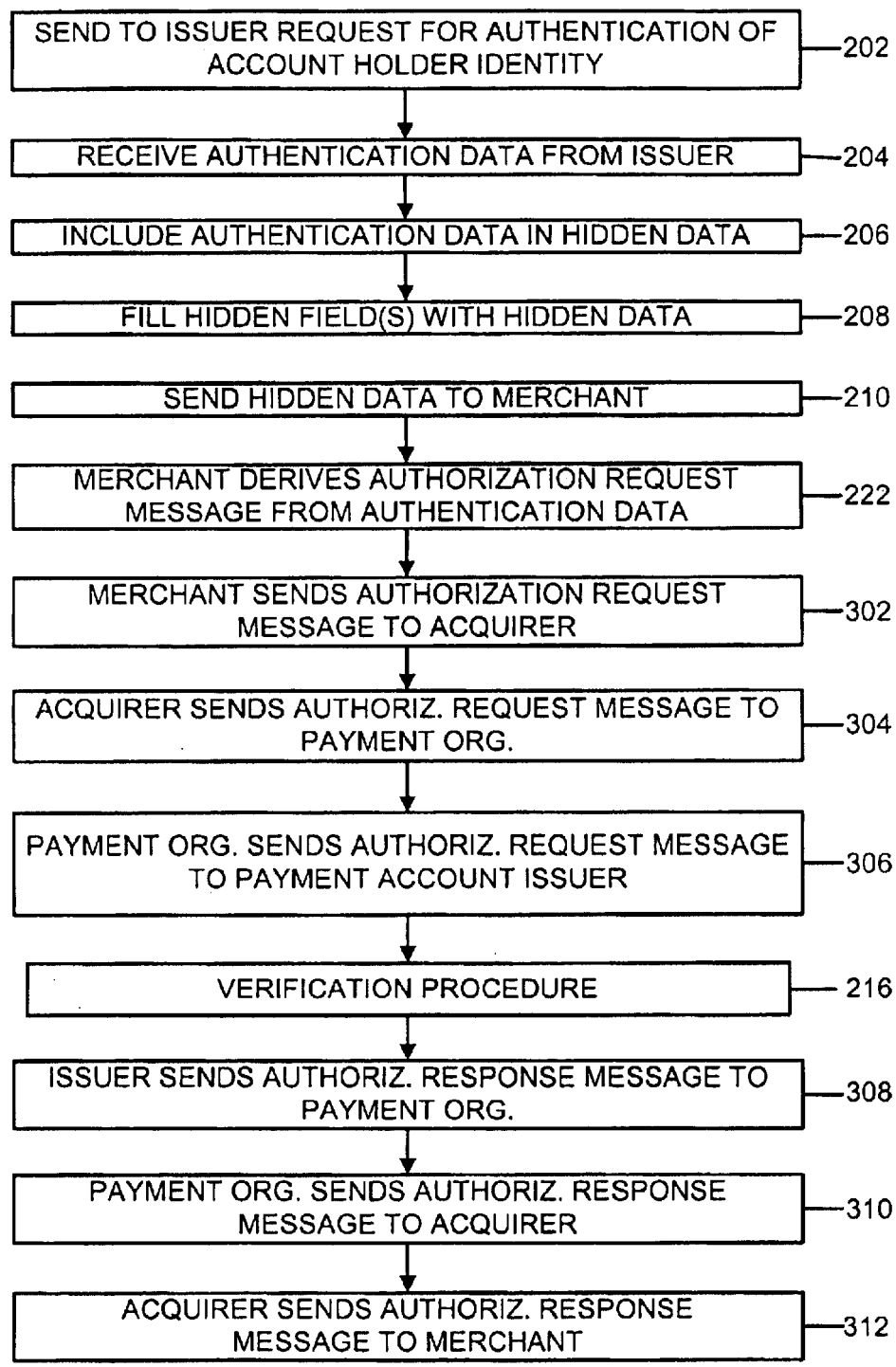
FIG. 3 is a flow diagram illustrating an additional exemplary payment procedure for use in the procedure illustrated in FIG. 1.

FIG. 3 illustrates an exemplary payment procedure 106 for use with the system illustrated in FIG. 5. In the illustrated procedure 106, the user software 402 sends to the issuer 406, through network portion 428, a request 412 for authentication of the identity of the account holder making the purchase of goods and/or services from the merchant 404 (step 202). In response to the request 412 for authentication, the issuer 406 sends authentication data 414 through network portion 428, and the authentication data 414 is received by the user software 402 (step 204). The user software 402 includes the authentication data 414 in hidden data 416 (step 206), and uses the hidden data 416 to fill the hidden fields in the Web page of the merchant 404 (step 208). The user software 402 sends the hidden data 416 to the merchant 404 through network portion 426 (step 210), as discussed above with respect to the procedure illustrated in FIG. 2. The merchant 404 derives an authorization request message 506 from the authentication data 416 (step 222), and sends the authorization request message 506 to the acquirer 514 through an additional network or network portion 502 (step 302). The acquirer 514 sends an authorization request message 508 to the payment organization 408 through yet another network or network portion 504 (step 304). The authorization request message 508 sent from the acquirer 514 to the payment organization 408 is typically identical to, or derived from, the message 506 sent from the merchant 404 to the acquirer 514. The payment organization sends an authorization request message 420 to the issuer 406 through network or network portion 432 (step 306). The authorization request message 420 sent from the payment organization 408 to the issuer 406 can be identical to, or derived from, the message 506 sent from the merchant 404 to the acquirer 514, and/or can be identical to, or derived from, the message 508 sent from the acquirer 514 to the payment organization 408. The issuer 406 uses a verification procedure 216 to process the authorization request message 420 received from the payment organization 408, in order to generate an authorization response message 422. The issuer 406 sends the authorization response message 422 to the payment organization 408 through network or network portion 432 (step 308). The payment organization 408 sends an authorization response message 510 to the acquirer 514 through network or network portion 504 (step 310). The authorization response message 510 sent from the payment organization 408 to the acquirer 514 is typically identical to, or derived from, the message 422 sent from the issuer 406 to the payment organization 408.

Optionally, the payment organization 408 can perform the verification procedure 216 on behalf of the issuer 406, as is discussed above with respect to the system illustrated in FIG. 4. If such stand-in processing is to be performed by the payment organization 408, then the payment organization 408 processes authorization request message 508 to generate authorization response message 510.

In any case, regardless of whether the verification procedure 216 has been performed by the issuer 406 or the payment organization 408, the acquirer 514 sends an authorization response message 512 to the merchant 404 through network or network portion 502 (step 312). The authorization response message 512 sent from the acquirer 514 to the merchant 404 can be identical to, or derived from, the message 422 sent from the issuer 406 to the payment organization 408, and/or can be identical to, or derived from, the message 510 sent from the payment organization 408 to the acquirer 514.

Preferably, the account holder registers with the issuer 406 before downloading the user software 402 for use in AAV-based transactions.

The registration process provides the following beneficial features:

Strong authentication of the account holder
Account holder registration with the issuer 406
Downloading of user software 402 to the account holder's computer To obtain the user software 402, the account holder first accesses the issuer's online banking Web site which is accessible from the issuer's Web server 444. If the account holder has already registered for access to the issuer's online banking site, the account holder logs in using his/her existing access credentials. These credentials are verified using any conventional online banking account holder authentication method.

If the account holder has not yet registered for access to the issuer's online banking site, the issuer 406 requires the account holder to register prior to obtaining the user software 402. Preferably, the issuer 406 strongly authenticates the identity of the account holder before or during registration, in order to ensure the security of subsequent transactions performed with the user software 402. Once the account holder has been successfully authenticated, the registration process proceeds with account holder profile initialization. The account holder is presented with an option to continue registering for the user software 402. Selection of the continued registration option navigates the account holder's Web browser to the user software registration page. This page presents the account holder with a list of accounts that can be registered for the software 402, and requests various pieces of information from the account holder in order to set up the account holder's profile within the issuer's verification processor 442. The information preferably includes at least the following:

Account Number
Account Expiration Date
Account CVC2 Verification Value

The following additional information can also be collected during profile initialization:

Account Holder Name
Account Holder Billing Address
Account Holder Shipping Address Optionally, the issuer 406 can automate the profile set-up based on account holder information which is available from the issuer's online banking site. Automating some or all of this process avoids requiring the account holder to re-enter this information, thus providing the account holder with a more convenient registration experience.

The data collected from the account holder or from the automated interface are sent to the issuer's verification processor 442 as part of the account holder's registration request. For systems in which the verification processor 442 is operated by an organization external to the issuer, the request and its resulting response should be adequately protected during transmission between organizations. For example, the security of the request and response can be ensured by sending these messages over a protected, private network connection, or by encrypting the message prior to transmission over a public network such as the Internet. The issuer's verification processor 442 processes the registration request and responds with either: (a) a confirmation that the registration was completed successfully; or (b) an indication that the registration failed, along with a message describing the reason for the failure.

Issuers should select a strong authentication mechanism that will ensure that the account holder being registered online can be properly identified and validated. When issuers implement the registration process, they should keep the following guidelines/preferences in mind when identifying shared secrets that can be used for authentication purposes:

Multiple pieces of information, rather than just one piece, should be used for the shared secret. For example, the account holder's mother's maiden name and the last four digits of his/her social security number can be used in combination with an issuer-generated password.

The shared secret should be verifiable. For example, if the account holder's mother's maiden name is to be used, the authorization system should be able to verify this information.

Knowledge of the entire shared secret should require access to multiple sources. It is preferable to avoid using a shared secret that is available completely within one document and/or from public information. For example, should the issuer 406 choose to use credit line and address information, both pieces of this shared secret are available on the account holder's monthly account statement. If the statement is intercepted, then the shared secret will be compromised.

The issuer 406 can optionally use several pieces of information to determine the shared secret. For example, the following information can be used:

A bank-generated password sent to the billing address of the account holder in a mailer which is separate from the statement.

A CVC2 which is only available on the signature panel of card.

A verifiable non-public number such as the last four digits of the account holder's social security number.

The Credit Line on the account (available on the monthly account statement).

After successful registration, the account holder can download and install the user software 402 onto his/her access device—typically a computer, PDA, or mobile telephone. The account holder's access device is preferably configured to run the user software 402 as a part of the initialization/startup sequence of the device, in order to cause the user software 402 to be activated automatically when the account holder navigates to a merchant's purchase page.

Upon activation and display, the user software 402 requests the account holder's access credentials in order to authenticate the account holder's identity during purchase transactions. The access credentials are typically managed by the issuer 402 and preferably include some or all of the following:

Userid/password

Smart card/PIN

Password released wallet secret

Biometric verification

Digital certificate(s)

Any other secure, issuer-approved authentication mechanism

In order to maximize cardholder security and to provide strong cardholder authentication to the issuer, authentication is preferably performed for each transaction, through the issuer's verification processor 442.

Optionally, the issuer 406 can choose to store data that tracks AAV generation and account holder transactions. Tracking the history of AAV generation, including the AAV, Card City, Card State/Country and Brand can be of assistance to the issuer 406 in supporting dispute management and chargeback processes. In addition, the issuer 406 can challenge account holder repudiation based on its records of authentication events and account holder confirmations of transactions. Such a challenge is typically based on the AAV, Card City, Card State/Country and Brand associated with each transaction. The issuer 406 can also choose to make the sale history available online to the account holder, thereby reducing the number of customer service inquires.

In the case of a purchase involving a split shipment, the merchant 404 preferably requests and obtains authorization for each part of the shipment. When processing a subsequent authorization due to a split shipment, the merchant 404 modifies the Control Byte 804 contained on the initial authorization AAV 802 from hexadecimal "82" to hexadecimal "02." Failure to modify the Control Byte 804 for a subsequent authorization will result in a decline of authorization by the issuer 406.

The merchant 404 may wish to re-transmit an authorization request after an initial issuer decline. If so, the AAV 802 is transmitted as a subsequent authorization with the Control Byte 804 modified from hexadecimal "82" to hexadecimal "02."

In some cases, the merchant 404 may generate, for a given transaction, a second authorization request having an AAV with the same value as the AAV in the original request. The second authorization request may not be bit-wise identical to the original request. For example, the requests might have different system-trace ID numbers. The merchant 404 would typically generate a second authorization request if:

The merchant 404 does not receive a response to the original authorization request within a pre-determined time-out period; or The merchant 404 fully reverses the original authorization, but later decides to re-instate it.

The merchant 404 preferably treats such authorization requests as subsequent authorization requests by flipping the most significant bit of the control byte 804. This will prevent such requests from being erroneously rejected by the issuer 406 as possible replay attacks.

It will be appreciated by those skilled in the art that the methods of FIGS. 1–7 can be implemented on various standard computer platforms operating under the control of suitable software defined by FIGS. 1–7. In some cases, dedicated computer hardware, such as a peripheral card in a conventional personal computer, can enhance the operational efficiency of the above methods.

Figure 9:
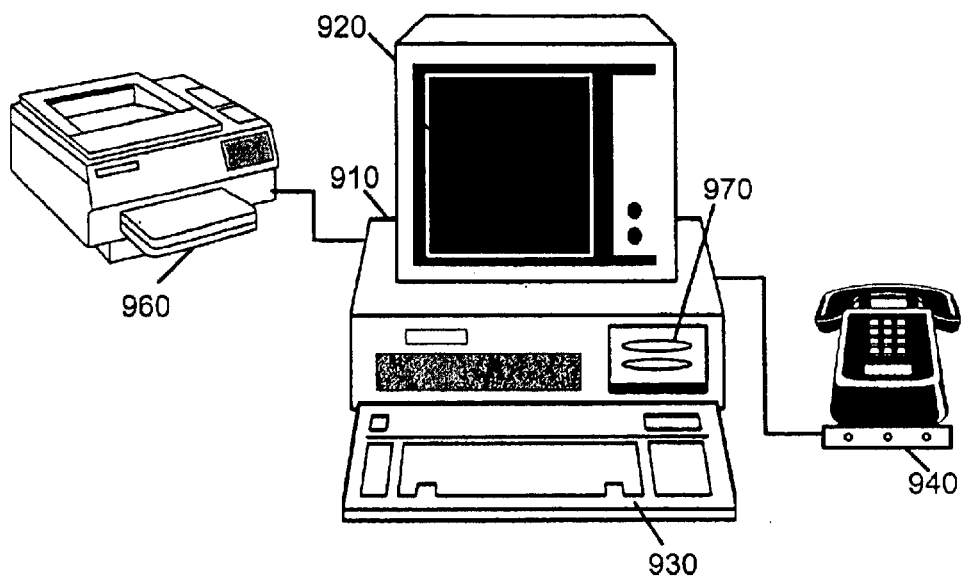
FIG. 9 is a diagram illustrating an exemplary computer system for conducting a payment transaction in accordance with the present invention.
Figure 10:
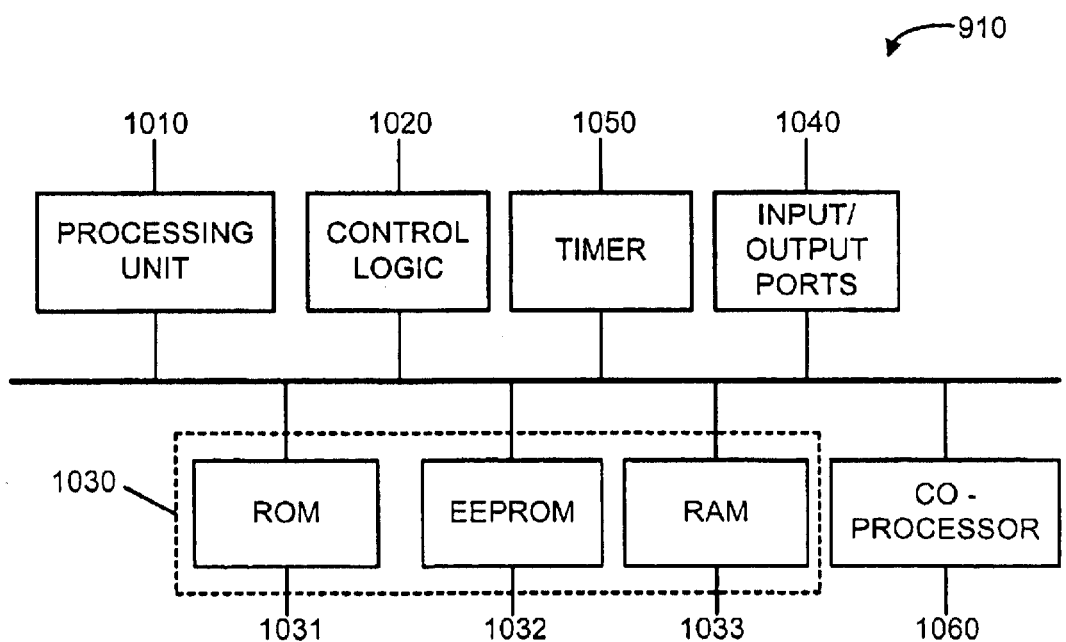
FIG. 10 is a block diagram illustrating an exemplary processing section for use in the computer system illustrated in FIG. 9.

FIGS. 9 and 10 illustrate typical computer hardware suitable for practicing the present invention. Referring to FIG. 9, the computer system includes a processing section 910, a display 920, a keyboard 930, and a communications peripheral device 940 such as a modem. The system can also include a printer 960. The computer system typically includes one or more disk drives 970 which can read and write to computer-readable media such as magnetic media (i.e., diskettes) and/or optical media (e.g., CD-ROMS or DVDs), for storing data and application software. While not shown, other input devices, such as a digital pointer (e.g., a "mouse") and the like can also be included. Computer hardware such as is illustrated in FIGS. 9 and 10 can be used to run the user software 402 illustrated in FIGS. 4 and 5, and/or can be used to perform the functions of the merchant 404, merchant's server 448, acquirer 514, payment and organization 408, verification processor 446, issuer 406, AAV-generation processor 440, verification processor 442, and/or issuer's server 444.

FIG. 10 is a functional block diagram which further illustrates the processing section 910. The processing section 910 generally includes a processing unit 1010, control logic 1020 and a memory unit 1030. Preferably, the processing section 910 can also include a timer 1050 and input/output ports 1040. The processing section 910 can also include a co-processor 1060, depending on the microprocessor used in the processing unit. Control logic 1020 provides, in conjunction with processing unit 1010, the control necessary to handle communications between memory unit 1030 and input/output ports 1040. Timer 1050 provides a timing reference signal for processing unit 1010 and control logic 1020. Co-processor 1060 provides an enhanced ability to perform complex computations in real time, such as those required by cryptographic algorithms.

Memory unit 1030 can include different types of memory, such as volatile and non-volatile memory and read-only and programmable memory. For example, as shown in FIG. 10, memory unit 1030 can include read-only memory (ROM) 1031, electrically erasable programmable read-only memory (EEPROM) 1032, and random-access memory (RAM) 1033. Different computer processors, memory configurations, data structures and the like can be used to practice the present invention, and the invention is not limited to a specific platform. For example, although the processing section 910 is illustrated in FIGS. 9 and 10 as part of a computer system, the processing section 910 and/or its components can be incorporated into a PDA or a mobile telephone.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

We claim:

1. A method for performing a payment transaction, comprising:
   receiving a set of Web page data by user software, the set of Web page data being for displaying a Web page;
   determining, by the user software, whether the Web page includes at least one hidden field;
   if the Web page includes the at least one hidden field, selecting a first payment procedure to be used for performing the particular payment transaction, the first payment procedure including filling the at least one hidden field with hidden data, by the user software, for sending the hidden data to a merchant; and
   if the Web page does not include the at least one hidden field, selecting a second payment procedure to be used for performing the particular payment transaction, the second payment procedure including filling at least one visible field with purchase data, for sending the purchase data to the merchant, the at least one visible field being included in the Web page.

2. A method according to claim 1, wherein the first payment procedure further includes receiving, by the user software, authentication data from a payment account issuer, the hidden data comprising the authentication data, and the authentication data being for authenticating an identity of an account holder of a payment account issued by the payment account issuer.

3. A method according to claim 2, wherein the first payment procedure further includes sending, from the user software to the payment account issuer, a request for authentication of the identity of the account holder, the authentication data being sent from the payment account issuer to the user software in response to the request for the authentication of the identity of the account holder.

4. A method according to claim 3, wherein the first payment procedure further includes the steps of:
   sending an authorization request message from the merchant to a payment organization, the authorization request message being derived from the authentication data;
   sending, from the payment organization to the payment account issuer, at least one of the authorization request message and a message derived from the authorization request message;
   using, by the payment account issuer, a verification procedure to process the at least one of the authorization request message and the message derived from the authorization request message, for generating an authorization response message;
   sending the authorization response message from the payment account issuer to the payment organization; and
   sending, from the payment organization to the merchant, at least one of the authorization response message and a message derived from the authorization response message.

5. A method according to claim 3, wherein the first payment procedure further includes the steps of:
   sending a first authorization request message from the merchant to an acquirer, the first authorization request message being derived from the authentication data;
   sending, from the acquirer to a payment organization, at least one of the first authorization request message and a second authorization request message derived from the first authorization request message;
   sending, from the payment organization to the payment account issuer, at least one of the at least one of the first and second authorization request messages and a third authorization request message derived from the at least one of the first and second authorization request messages;
   using, by the payment account issuer, a verification procedure to process the at least one of the at least one of the first and second authorization request messages and the third authorization request message, for generating a first authorization response message;
   sending the first authorization response message from the payment account issuer to the payment organization;
   sending, from the payment organization to the acquirer, at least one of the first authorization response message and a second authorization response message derived from the first authorization response message; and
   sending, from the acquirer to the merchant, at least one of the at least one of the first and second authorization response messages and a third authorization response message derived from the at least one of the first and second authorization response messages.

6. A method according to claim 2, wherein the first payment procedure further includes the steps of:
   sending an authorization request message from the merchant to a payment organization, the authorization request message being derived from the authorization data;
   sending, from the payment organization to the payment account issuer, at least one of the authorization request message and a message derived from the authorization request message;
   using, by the payment account issuer, a verification procedure to process the at least one of the authorization request message and the message derived from the authorization request message, for generating an authorization response message;
   sending the authorization response message from the payment account issuer to the payment organization; and
   sending, from the payment organization to the merchant, at least one of the authorization response message and a message derived from the authorization response message.

7. A method according to claim 2, wherein the first payment procedure further includes the steps of:
   sending a first authorization request message from the merchant to an acquirer, the first authorization request message being derived from the authentication data;

sending, from the acquirer to a payment organization, at least one of the first authorization request message and a second authorization request message derived from the first authorization request message;

sending, from the payment organization to the payment account issuer, at least one of the at least one of the first and second authorization request messages and a third authorization request message derived from the at least one of the first and second authorization request messages;

using, by the payment account issuer, a verification procedure to process the at least one of the at least one of the first and second authorization request messages and the third authorization request message, for generating a first authorization response message;

sending the first authorization response message from the payment account issuer to the payment organization;

sending, from the payment organization to the acquirer, at least one of the first authorization response message and a second authorization response message derived from the first authorization response message; and sending, from the acquirer to the merchant, at least one of the at least one of the first and second authorization response messages and a third authorization response message derived from the at least one of the first and second authorization response messages.

8. A method according to claim 1, wherein the first payment procedure further includes the steps of:

sending an authorization request message from the merchant to a payment organization, the authorization request message being derived from the hidden data;

sending, from the payment organization to a payment account issuer, at least one of the authorization request message and a message derived from the authorization request message;

using, by the payment account issuer, a verification procedure to process the at least one of the authorization request message and the message derived from the authorization request message, for generating an authorization response message;

sending the authorization response message from the payment account issuer to the payment organization; and sending, from the payment organization to the merchant, at least one of the authorization response message and a message derived from the authorization response message.

9. A method according to claim 8, wherein the hidden data include at least data associated with the particular payment transaction, and the verification procedure comprises the steps of:

determining by the payment account issuer whether the data associated with the particular payment transaction have been previously used for authorizing any payment transaction; and if the data associated with the particular payment transaction have been previously used for authorizing any payment transaction, including a denial of authorization in the authorization response message.

10. A method according to claim 1, wherein the first payment procedure further includes the steps of:

sending a first authorization request message from the merchant to an acquirer, the first authorization request message being derived from the hidden data;

sending, from the acquirer to a payment organization, at least one of the first authorization request message and a second authorization request message derived from the first authorization request message;

sending, from the payment organization to a payment account issuer, at least one of the at least one of the first and second authorization request messages and a third authorization request message derived from the at least one of the first and second authorization request messages;

using, by the payment account issuer, a verification procedure to process the at least one of the at least one of the first and second authorization request messages and the third authorization request message, for generating a first authorization response message;

sending the first authorization response message from the payment account issuer to the payment organization;

sending, from the payment organization to the acquirer, at least one of the first authorization response message and a second authorization response message derived from the first authorization response message; and sending, from the acquirer to the merchant, at least one of the at least one of the first and second authorization response messages and a third authorization response message derived from the at least one of the first and second authorization response messages.

11. A method according to claim 10, wherein the hidden data include at least data associated with the particular payment transaction, and the verification procedure comprises the steps of:

determining by the payment account issuer whether the data associated with the particular payment transaction have been previously used for authorizing any payment transaction; and if the data associated with the particular payment transaction have been previously used for authorizing any payment transaction, including a denial of authorization in the first authorization response message.

12. A method according to claim 1, wherein the first payment procedure further includes the steps of:

sending an authorization request message from the merchant to a payment organization, the authorization request message being derived from the hidden data;

using, by the payment organization, a verification procedure to process the authorization request message, for generating an authorization response message; and sending the authorization response message from the payment organization to the merchant.

13. A method according to claim 1, wherein the first payment procedure further includes the steps of:

sending a first authorization request message from the merchant to an acquirer, the first authorization request message being derived from the hidden data;

sending, from the acquirer to a payment organization, at least one of the first authorization request message and a second authorization request message derived from the first authorization request message;

using, by the payment organization, a verification procedure to process the at least one of the first and second authorization request messages, for generating a first authorization response message;

sending the first authorization response message from the payment organization to the acquirer; and sending, from the acquirer to the merchant, at least one of the first authorization response message and a second authorization response message derived from the first authorization response message.

14. A method for performing a payment transaction, comprising:
receiving a set of Web page data by user software, the set of Web page data being for displaying a Web page, and the Web page including at least one hidden field;
receiving, by the user software, authentication data from a payment account issuer, the authentication data being for authenticating an identity of an account holder of a payment account issued by the payment account issuer; and
filling the at least one hidden field with the authentication data, by the user software, for sending the authentication data to a merchant.

15. A method according to claim 14, further comprising sending, from the user software to the payment account issuer, a request for authentication of the identity of the account holder, the authentication data being sent from the payment account issuer to the user software in response to the request for the authentication of the identity of the account holder.

16. A method according to claim 15, further comprising:
sending an authorization request message from the merchant to a payment organization, the authorization request message being derived from the authentication data;
sending, from the payment organization to the payment account issuer, at least one of the authorization request message and a message derived from the authorization request message;
using, by the payment account issuer, a verification procedure to process the at least one of the authorization request message and the message derived from the authorization request message, for generating an authorization response message;
sending the authorization response message from the payment account issuer to the payment organization; and
sending, from the payment organization to the merchant, at least one of the authorization response message and a message derived from the authorization response message.

17. A method according to claim 15, further comprising:
sending a first authorization request message from the merchant to an acquirer, the first authorization request message being derived from the authentication data;
sending, from the acquirer to a payment organization, at least one of the first authorization request message and a second authorization request message derived from the first authorization request message;
sending, from the payment organization to the payment account issuer, at least one of the at least one of the first and second authorization request messages and a third authorization request message derived from the at least one of the first and second authorization request messages;
using, by the payment account issuer, a verification procedure to process the at least one of the at least one of the first and second authorization request messages and the third authorization request message, for generating a first authorization response message;
sending the first authorization response message from the payment account issuer to the payment organization;
sending, from the payment organization to the acquirer, at least one of the first authorization response message and a second authorization response message derived from the first authorization response message; and
sending, from the acquirer to the merchant, at least one of the at least one of the first and second authorization response messages and a third authorization response message derived from the at least one of the first and second authorization response messages.

18. A method according to claim 14, further comprising:
sending an authorization request message from the merchant to a payment organization, the authorization request message being derived from the authentication data;
sending, from the payment organization to the payment account issuer, at least one of the authorization request message and a message derived from the authorization request message;
using, by the payment account issuer, a verification procedure to process the at least one of the authorization request message and the message derived from the authorization request message, for generating an authorization response message;
sending the authorization response message from the payment account issuer to the payment organization; and
sending, from the payment organization to the merchant, at least one of the authorization response message and a message derived from the authorization response message.

19. A method according to claim 14, further comprising:
sending a first authorization request message from the merchant to an acquirer, the first authorization request message being derived from the authentication data;
sending, from the acquirer to a payment organization, at least one of the first authorization request message and a second authorization request message derived from the first authorization request message;
sending, from the payment organization to the payment account issuer, at least one of the at least one of the first and second authorization request messages and a third authorization request message derived from the at least one of the first and second authorization request messages;
using, by the payment account issuer, a verification procedure to process the at least one of the at least one of the first and second authorization request messages and the third authorization request message, for generating a first authorization response message;
sending the first authorization response message from the payment account issuer to the payment organization;
sending, from the payment organization to the acquirer, at least one of the first authorization response message and a second authorization response message derived from the first authorization response message; and
sending, from the acquirer to the merchant, at least one of the at least one of the first and second authorization response messages and a third authorization response message derived from the at least one of the first and second authorization response messages.

20. A method according to claim 14, further comprising:
sending an authorization request message from the merchant to a payment organization, the authorization request message being derived from the authentication data;
using, by the payment organization, a verification procedure to process the authorization request message, for generating an authorization response message; and
sending the authorization response message from the payment organization to the merchant.

21. A method according to claim 14, further comprising:
sending a first authorization request message from the merchant to an acquirer, the first authorization request message being derived from the authentication data;
sending, from the acquirer to a payment organization, at least one of the first authorization request message and a second authorization request message derived from the first authorization request message;
using, by the payment organization, a verification procedure to process the at least one of the first and second authorization request messages, for generating a first authorization response message;
sending the first authorization response message from the payment organization to the acquirer; and
sending, from the acquirer to the merchant, at least one of the first authorization response message and a second authorization response message derived from the first authorization response message.

22. A method for performing a payment transaction, comprising:
receiving a first set of Web page data by user software, the first set of Web page data being for displaying a first Web page;
determining, by the user software, whether the first Web page includes a first hidden field, the first hidden field being for indicating to the user software that the first Web page is capable of being used for performing a single-click payment procedure; and
if the first Web page includes the first hidden field, filling the first hidden field, by the user software, with data for informing a merchant that the user software is being used for performing at least one payment transaction.

23. A method according to claim 22, further comprising selecting, by an account holder, the single-click payment procedure to be performed using the first Web page.

24. A method according to claim 23, further comprising the steps of:
receiving a second set of Web page data by the user software, the second set of Web page data representing a second Web page, the second Web page including a second hidden field;
filling the second hidden field with authentication data, by the user software, for sending the authentication data to the merchant, the authentication data being for authenticating an identity of the account holder; and
initiating transmission of the authentication data to the merchant.

25. A method according to claim 24, further comprising receiving the authentication data, by the user software, from a payment account issuer which has issued a payment account to the account holder.

26. A method according to claim 25, further comprising:
sending an authorization request message from the merchant to a payment organization, the authorization request message being derived from the authentication data;
sending, from the payment organization to the payment account issuer, at least one of the authorization request message and a message derived from the authorization request message;
using, by the payment account issuer, a verification procedure to process the at least one of the authorization request message and the message derived from the authorization request message, for generating an authorization response message;
sending the authorization response message from the payment account issuer to the payment organization; and
sending, from the payment organization to the merchant, at least one of the authorization response message and a message derived from the authorization response message.

27. A method according to claim 25, further comprising:
sending a first authorization request message from the merchant to an acquirer, the first authorization request message being derived from the authentication data;
sending, from the acquirer to a payment organization, at least one of the first authorization request message and a second authorization request message derived from the first authorization request message;
sending, from the payment organization to the payment account issuer, at least one of the at least one of the first and second authorization request messages and a third authorization request message derived from the at least one of the first and second authorization request messages;
using, by the payment account issuer, a verification procedure to process the at least one of the at least one of the first and second authorization request messages and the third authorization request message, for generating a first authorization response message;
sending the first authorization response message from the payment account issuer to the payment organization;
sending, from the payment organization to the acquirer, at least one of the first authorization response message and a second authorization response message derived from the first authorization response message; and
sending, from the acquirer to the merchant, at least one of the at least one of the first and second authorization response messages and a third authorization response message derived from the at least one of the first and second authorization response messages.

28. An apparatus for performing a payment transaction, comprising:
a first user processor for receiving a set of Web page data, the set of Web page data being for displaying a Web page;
a second user processor for determining whether the Web page includes at least one hidden field;
a processor for selecting a first payment system to be used for performing a particular payment transaction if the Web page includes the at least one hidden field, the first payment system comprising a third user processor for filling the at least one hidden field with hidden data, for sending the hidden data to a merchant; and
a processor for selecting a second payment system to be used for performing the particular payment transaction if the Web page does not include the at least one hidden field, the second payment system comprising a processor for filling at least one visible field with purchase data, for sending the purchase data to the merchant, the at least one visible field being included in the Web page.

29. An apparatus according to claim 28, wherein the first payment system further comprises:
a payment account issuer for issuing a payment account to an account holder; and
a fourth user processor for receiving authentication data from the payment account issuer, the hidden data comprising the authentication data, and the authentication data being for authenticating an identity of the account holder.

30. An apparatus according to claim 29, wherein the first payment system further comprises a fifth user processor for sending, to the payment account issuer, a request for authentication of the identity of the account holder, the authentication data being sent from the payment account issuer to the fourth user processor in response to the request for the authentication of the identity of the account holder.

31. An apparatus according to claim 30, wherein the first payment system further comprises a payment organization for receiving an authorization request message from the merchant, the authorization request message being derived from the authentication data, the payment organization being further for sending, to the payment account issuer, at least one of the authorization request message and a message derived from the authorization request message, the payment account issuer comprising a verification processor for verifying the at least one of the authorization request message and the message derived from the authorization request message, for generating an authorization response message, the payment account issuer being further for sending the authorization response message to the payment organization, and the payment organization being further for sending, to the merchant, at least one of the authorization response message and a message derived from the authorization response message.

32. An apparatus according to claim 30, wherein the first payment system further comprises:
an acquirer for receiving a first authorization request message from the merchant, the first authorization request message being derived from the authentication data; and
a payment organization for receiving, from the acquirer, at least one of the first authorization request message and a second authorization request message derived from the first authorization request message, the payment organization being further for sending, to the payment account issuer, at least one of the at least one of the first and second authorization request messages and a third authorization request message derived from the at least one of the first and second authorization request messages, the payment account issuer comprising a verification processor for verifying the at least one of the at least one of the first and second authorization request messages and the third authorization request message, for generating a first authorization response message, the payment account issuer being further for sending the first authorization response message to the payment organization, the payment organization being further for sending, to the acquirer, at least one of the first authorization response message and a second authorization response message derived from the first authorization response message, and the acquirer being further for sending, to the merchant, at least one of the at least one of the first and second authorization response messages and a third authorization response message derived from the at least one of the first and second authorization response messages.

33. An apparatus according to claim 29, wherein the first payment system further comprises a payment organization for receiving an authorization request message from the merchant, the authorization request message being derived from the authorization data, the payment organization being further for sending, to the payment account issuer, at least one of the authorization request message and a message derived from the authorization request message, the pay-ment account issuer comprising a verification processor for verifying the at least one of the authorization request message and the message derived from the authorization request message, for generating an authorization response message, the payment account issuer being further for sending the authorization response message to the payment organization, and the payment organization being further for sending, to the merchant, at least one of the authorization response message and a message derived from the authorization response message.

34. An apparatus according to claim 29, wherein the first payment system further comprises:
an acquirer for receiving a first authorization request message from the merchant, the first authorization request message being derived from the authentication data; and
a payment organization for receiving, from the acquirer, at least one of the first authorization request message and a second authorization request message derived from the first authorization request message, the payment organization being further for sending, to the payment account issuer, at least one of the at least one of the first and second authorization request messages and a third authorization request message derived from the at least one of the first and second authorization request messages, the payment account issuer comprising a verification processor for verifying the at least one of the at least one of the first and second authorization request messages and the third authorization request message, for generating a first authorization response message, the payment account issuer being further for sending the first authorization response message to the payment organization, the payment organization being for sending, to the acquirer, at least one of the first authorization response message and a second authorization response message derived from the first authorization response message, and the acquirer being further for sending, to the merchant, at least one of the at least one of the first and second authorization response messages and a third authorization response message derived from the at least one of the first and second authorization response messages.

35. An apparatus according to claim 28, wherein the first payment system further comprises:
a payment account issuer; and
a payment organization for receiving an authorization request message from the merchant, the authorization request message being derived from the hidden data, the payment organization being further for sending, to the payment account issuer, at least one of the authorization request message and a message derived from the authorization request message, the payment account issuer comprising a verification processor for verifying the at least one of the authorization request message and the message derived from the authorization request message, for generating an authorization response message, the payment account issuer being for sending the authorization response message to the payment organization, and the payment organization being further for sending, to the merchant, at least one of the authorization response message and a message derived from the authorization response message.

36. An apparatus according to claim 35, wherein the hidden data include at least data associated with the particular payment transaction, and the verification processor comprises:
a processor for determining whether the data associated with the particular payment transaction have been previously used for authorizing any payment transaction; and a processor for including a denial of authorization in the authorization response message if the data associated with the particular payment transaction have been previously used for authorizing any payment transaction.

37. An apparatus according to claim 28, wherein the first payment system further comprises:

a payment account issuer;

an acquirer for receiving a first authorization request message from the merchant, the first authorization request message being derived from the hidden data; and a payment organization for receiving, from the acquirer, at least one of the first authorization request message and a second authorization request message derived from the first authorization request message, the payment organization being further for sending, to the payment account issuer, at least one of the at least one of the first and second authorization request messages and a third authorization request message derived from the at least one of the first and second authorization request messages, the payment account issuer comprising a verification processor for verifying the at least one of the at least one of the first and second authorization request messages and the third authorization request message, for generating a first authorization response message, the payment account issuer being for sending the first authorization response message to the payment organization, the payment organization being further for sending, to the acquirer, at least one of the first authorization response message and a second authorization response message derived from the first authorization response message, and the acquirer being further for sending, to the merchant, at least one of the at least one of the first and second authorization response messages and a third authorization response message derived from the at least one of the first and second authorization response messages.

38. An apparatus according to claim 37, wherein the hidden data include at least data associated with the particular payment transaction, and the verification processor comprises:

a processor for determining whether the data associated with the particular payment transaction have been previously used for authorizing any payment transaction; and a processor for including a denial of authorization in the first authorization response message if the data associated with the particular payment transaction have been previously used for authorizing any payment transaction.

39. An apparatus according to claim 28, wherein the first payment system further comprises a payment organization for receiving an authorization request message from the merchant, the authorization request message being derived from the hidden data, the payment organization comprising a verification processor for verifying the authorization request message, for generating an authorization response message, and the payment organization being further for sending the authorization response message to the merchant.

40. An apparatus according to claim 28, wherein the first payment system further comprises:

an acquirer for receiving a first authorization request message from the merchant, the first authorization request message being derived from the hidden data; and a payment organization for receiving, from the acquirer, at least one of the first authorization request message and a second authorization request message derived from the first authorization request message, the payment organization comprising a verification processor for verifying the at least one of the first and second authorization request messages, for generating a first authorization response message, the payment organization being further for sending the first authorization response message to the acquirer; and the acquirer being further for sending, to the merchant, at least one of the first authorization response message and a second authorization response message derived from the first authorization response message.

41. An apparatus for performing a payment transaction, comprising:

a first user processor for receiving a set of Web page data, the set of Web page data being for displaying a Web page, and the Web page including at least one hidden field;

a payment account issuer for issuing a payment account to an account holder;

a second user processor for receiving authentication data from the payment account issuer, the authentication data being for authenticating an identity of the account holder; and a third user processor for filling the at least one hidden field with the authentication data, for sending the authentication data to a merchant.

42. An apparatus according to claim 41, further comprising a fourth user processor for sending, to the payment account issuer, a request for authentication of the identity of the account holder, the authentication data being sent from the payment account issuer to the second user processor in response to the request for the authentication of the identity of the account holder.

43. An apparatus according to claim 42, further comprising a payment organization for receiving an authorization request message from the merchant, the authorization request message being derived from the authentication data, the payment organization being further for sending, to the payment account issuer, at least one of the authorization request message and a message derived from the authorization request message, the payment account issuer comprising a verification processor for verifying the at least one of the authorization request message and the message derived from the authorization request message, for generating an authorization response message, the payment account issuer being further for sending the authorization response message to the payment organization; and the payment organization being for sending, to the merchant, at least one of the authorization response message and a message derived from the authorization response message.

44. An apparatus according to claim 42, further comprising:

an acquirer for receiving a first authorization request message from the merchant, the first authorization request message being derived from the authentication data; and a payment organization for receiving, from the acquirer, at least one of the first authorization request message and a second authorization request message derived from the first authorization request message, the payment organization being further for sending, to the payment account issuer, at least one of the at least one of the first and second authorization request messages and a third authorization request message derived from the at least one of the first and second authorization request messages, the payment account issuer comprising a verification processor for verifying the at least one of the at least one of the first and second authorization request messages and the third authorization request message, for generating a first authorization response message, the payment account issuer being further for sending first authorization response message to the payment organization, the payment organization being further for sending, to the acquirer, at least one of the first authorization response message and a second authorization response message derived from the first authorization response message, and the acquirer being further for sending, to the merchant, at least one of the at least one of the first and second authorization response messages and a third authorization response message derived from the at least one of the first and second authorization response messages.

45. An apparatus according to claim 41, further comprising a payment organization for receiving an authorization request message from the merchant, the authorization request message being derived from the authentication data, the payment organization being further for sending, to the payment account issuer, at least one of the authorization request message and a message derived from the authorization request message, the payment account issuer comprising a verification processor for verifying the at least one of the authorization request message and the message derived from the authorization request message, for generating an authorization response message, the payment account issuer being further for sending the authorization response message to the payment organization; and the payment organization being for sending, to the merchant, at least one of the authorization response message and a message derived from the authorization response message.

46. An apparatus according to claim 41, further comprising:
an acquirer for receiving a first authorization request message from the merchant, the first authorization request message being derived from the authentication data; and
a payment organization for receiving, from the acquirer, at least one of the first authorization request message and a second authorization request message derived from the first authorization request message, the payment organization being further for sending, to the payment account issuer, at least one of the at least one of the first and second authorization request messages and a third authorization request message derived from the at least one of the first and second authorization request messages, the payment account issuer comprising a verification processor for verifying the at least one of the at least one of the first and second authorization request messages and the third authorization request message, for generating a first authorization response message, the payment account issuer being further for sending the first authorization response message to the payment organization, the payment organization being further for sending, to the acquirer, at least one of the first authorization response message and a second authorization response message derived from the first authorization response message, and the acquirer being further for sending, to the merchant, at least one of the at least one of the first and second authorization response messages and a third authorization response message derived from the at least one of the first and second authorization response messages.

47. An apparatus according to claim 41, further comprising a payment organization for receiving an authorization request message from the merchant, the authorization request message being derived from the authentication data, the payment organization comprising a verification processor for verifying the authorization request message, for generating an authorization response message, and the payment organization being further for sending the authorization response message to the merchant.

48. An apparatus according to claim 41, further comprising:
an acquirer for receiving a first authorization request message from the merchant, the first authorization request message being derived from the authentication data; and
a payment organization for receiving, from the acquirer, at least one of the first authorization request message and a second authorization request message derived from the first authorization request message, the payment organization comprising a verification processor for verifying the at least one of the first and second authorization request messages, for generating a first authorization response message, the payment organization being further for sending the first authorization response message to the acquirer, and the acquirer being further for sending, to the merchant, at least one of the first authorization response message and a second authorization response message derived from the first authorization response message.

49. An arrangement for performing a payment transaction, comprising:
a first user processor for receiving a first set of Web page data, the first set of Web page data being for displaying a first Web page;
a second user processor for determining whether the first Web page includes a first hidden field, the first hidden field being for indicating to the user software that the first Web page is capable of being used, by a single-click payment system, to perform at least one payment transaction;
a third user processor for, if the first Web page includes the first hidden field, filling the first hidden field with data for informing a merchant that the user processor is being used for performing the at least one payment transaction.

50. An arrangement according to claim 49, further comprising an account holder for selecting the single-click payment procedure to be performed using the first Web page.

51. An arrangement according to claim 50, further comprising:
a fourth user processor for receiving a second set of Web page data, the second set of Web page data representing a second Web page, the second Web page including a second hidden field;
a fifth user processor for filling the second hidden field with authentication data, for sending the authentication data to the merchant, the authentication data being for authenticating an identity of the account holder; and
a sixth user processor for initiating transmission of the authentication data to the merchant.

52. An arrangement according to claim 51, further comprising:
a payment account issuer for issuing a payment account to the account holder; and
a seventh user processor for receiving the authentication data from the payment account issuer.

53. An arrangement according to claim 52, further comprising a payment organization for receiving an authorization request message from the merchant, the authorization request message being derived from the authentication data, the payment organization being further for sending, to the payment account issuer, at least one of the authorization request message and a message derived from the authorization request message, the payment account issuer comprising a verification processor for verifying the at least one of the authorization request message and the message derived from the authorization request message, for generating an authorization response message, the payment account issuer being further for sending the authorization response message to the payment organization, and the payment organization being further for sending, to the merchant, at least one of the authorization response message and a message derived from the authorization response message.

54. An arrangement according to claim 52, further comprising:
   an acquirer for receiving a first authorization request message from the merchant, the first authorization request message being derived from the authentication data; and
   a payment organization for receiving, from the acquirer, at least one of the first authorization request message and a second authorization request message derived from the first authorization request message, the payment organization being further for sending, to the payment account issuer, at least one of the at least one of the first and second authorization request messages and a third authorization request message derived from the at least one of the first and second authorization request messages, the payment account issuer comprising a verification processor for verifying the at least one of the at least one of the first and second authorization request messages and the third authorization request message, for generating a first authorization response message, the payment account issuer being further for sending the first authorization response message to the payment organization, the payment organization being further for sending, to the acquirer, at least one of the first authorization response message and a second authorization response message derived from the first authorization response message, and the acquirer being further for sending, to the merchant, at least one of the at least one of the first and second authorization response messages and a third authorization response message derived from the at least one of the first and second authorization response messages.

55. A computer-readable medium having a set of instructions operable to direct a processor to perform the steps of:
   receiving a set of Web page data by a user processor, the set of Web page data being for displaying a Web page;
   determining, by the user processor, whether the Web page includes at least one hidden field;
   if the Web page includes the at least one hidden field, selecting a first payment procedure to be used for performing a particular payment transaction, the first payment procedure including filling the at least one hidden field with hidden data, by the user processor, for sending the hidden data to a merchant; and
   if the Web page does not include the at least one hidden field, selecting a second payment procedure to be used for performing the particular payment transaction, the second payment procedure including filling at least one visible field with purchase data, for sending the purchase data to the merchant, the at least one visible field being included in the Web page.

56. A computer-readable medium according to claim 55, wherein the first payment procedure further includes receiving, by the user processor, authentication data from a payment account issuer, the hidden data comprising the authentication data, and the authentication data being for authenticating an identity of an account holder of a payment account issued by the payment account issuer.

57. A computer-readable medium according to claim 56, wherein the first payment procedure further includes sending, from the user processor to the payment account issuer, a request for authentication of the identity of the account holder, the authentication data being sent from the payment account issuer to the user processor in response to the request for the authentication of the identity of the account holder.

58. A computer-readable medium according to claim 57, wherein the first payment procedure further includes the steps of:
   sending an authorization request message from the merchant to a payment organization, the authorization request message being derived from the authentication data;
   sending, from the payment organization to the payment account issuer, at least one of the authorization request message and a message derived from the authorization request message;
   using, by the payment account issuer, a verification procedure to process the at least one of the authorization request message and the message derived from the authorization request message, for generating an authorization response message;
   sending the authorization response message from the payment account issuer to the payment organization; and
   sending, from the payment organization to the merchant, at least one of the authorization response message and a message derived from the authorization response message.

59. A computer-readable medium according to claim 57, wherein the first payment procedure further includes the steps of:
   sending a first authorization request message from the merchant to an acquirer, the first authorization request message being derived from the authentication data;
   sending, from the acquirer to a payment organization, at least one of the first authorization request message and a second authorization request message derived from the first authorization request message;
   sending, from the payment organization to the payment account issuer, at least one of the at least one of the first and second authorization request messages and a third authorization request message derived from the at least one of the first and second authorization request messages;
   using, by the payment account issuer, a verification procedure to process the at least one of the at least one of the first and second authorization request messages and the third authorization request message, for generating a first authorization response message;
   sending the first authorization response message from the payment account issuer to the payment organization;
   sending, from the payment organization to the acquirer, at least one of the first authorization response message and a second authorization response message derived from the first authorization response message; and sending, from the acquirer to the merchant, at least one of the at least one of the first and second authorization response messages and a third authorization response message derived from the at least one of the first and second authorization response messages.

60. A computer-readable medium according to claim 56, wherein the first payment procedure further includes the steps of:

sending an authorization request message from the merchant to a payment organization, the authorization request message being derived from the authorization data;

sending, from the payment organization to the payment account issuer, at least one of the authorization request message and a message derived from the authorization request message;

using, by the payment account issuer, a verification procedure to process the at least one of the authorization request message and the message derived from the authorization request message, for generating an authorization response message;

sending the authorization response message from the payment account issuer to the payment organization; and sending, from the payment organization to the merchant, at least one of the authorization response message and a message derived from the authorization response message.

61. A computer-readable medium according to claim 56, wherein the first payment procedure further includes the steps of:

sending a first authorization request message from the merchant to an acquirer, the first authorization request message being derived from the authentication data;

sending, from the acquirer to a payment organization, at least one of the first authorization request message and a second authorization request message derived from the first authorization request message;

sending, from the payment organization to the payment account issuer, at least one of the at least one of the first and second authorization request messages and a third authorization request message derived from the at least one of the first and second authorization request messages;

using, by the payment account issuer, a verification procedure to process the at least one of the at least one of the first and second authorization request messages and the third authorization request message, for generating a first authorization response message;

sending the first authorization response message from the payment account issuer to the payment organization;

sending, from the payment organization to the acquirer, at least one of the first authorization response message and a second authorization response message derived from the first authorization response message; and sending, from the acquirer to the merchant, at least one of the at least one of the first and second authorization response messages and a third authorization response message derived from the at least one of the first and second authorization response messages.

62. A computer-readable medium according to claim 55, wherein the first payment procedure further includes the steps of:

sending an authorization request message from the merchant to a payment organization, the authorization request message being derived from the hidden data;

sending, from the payment organization to a payment account issuer, at least one of the authorization request message and a message derived from the authorization request message;

using, by the payment account issuer, a verification procedure to process the at least one of the authorization request message and the message derived from the authorization request message, for generating an authorization response message;

sending the authorization response message from the payment account issuer to the payment organization; and sending, from the payment organization to the merchant, at least one of the authorization response message and a message derived from the authorization response message.

63. A computer-readable medium according to claim 62, wherein the hidden data include at least data associated with the particular payment transaction, and the verification procedure comprises the steps of:

determining by the payment account issuer whether the data associated with the particular payment transaction have been previously used for authorizing any payment transaction; and if the data associated with the particular payment transaction have been previously used for authorizing any payment transaction, including a denial of authorization in the authorization response message.

64. A computer-readable medium according to claim 55, wherein the first payment procedure further includes the steps of:

sending a first authorization request message from the merchant to an acquirer, the first authorization request message being derived from the hidden data;

sending, from the acquirer to a payment organization, at least one of the first authorization request message and a second authorization request message derived from the first authorization request message;

sending, from the payment organization to a payment account issuer, at least one of the at least one of the first and second authorization request messages and a third authorization request message derived from the at least one of the first and second authorization request messages;

using, by the payment account issuer, a verification procedure to process the at least one of the at least one of the first and second authorization request messages and the third authorization request message, for generating a first authorization response message;

sending the first authorization response message from the payment account issuer to the payment organization;

sending, from the payment organization to the acquirer, at least one of the first authorization response message and a second authorization response message derived from the first authorization response message; and sending, from the acquirer to the merchant, at least one of the at least one of the first and second authorization response messages and a third authorization response message derived from the at least one of the first and second authorization response messages.

65. A computer-readable medium according to claim 64, wherein the hidden data include at least data associated with the particular payment transaction, and the verification procedure comprises the steps of:
- determining by the payment account issuer whether the data associated with the particular payment transaction have been previously used for authorizing any payment transaction; and
- if the data associated with the particular payment transaction have been previously used for authorizing any payment transaction, including a denial of authorization in the first authorization response message.

66. A computer-readable medium according to claim 55, wherein the first payment procedure further includes the steps of:
- sending an authorization request message from the merchant to a payment organization, the authorization request message being derived from the hidden data;
- using, by the payment organization, a verification procedure to process the authorization request message, for generating an authorization response message; and
- sending the authorization response message from the payment organization to the merchant.

67. A computer-readable medium according to claim 55, wherein the first payment procedure further includes the steps of:
- sending a first authorization request message from the merchant to an acquirer, the first authorization request message being derived from the hidden data;
- sending, from the acquirer to a payment organization, at least one of the first authorization request message and a second authorization request message derived from the first authorization request message;
- using, by the payment organization, a verification procedure to process the at least one of the first and second authorization request messages, for generating a first authorization response message;
- sending the first authorization response message from the payment organization to the acquirer; and
- sending, from the acquirer to the merchant, at least one of the first authorization response message and a second authorization response message derived from the first authorization response message.

68. A computer-readable medium having a set of instructions operable to direct at least one processor to perform the steps of:
- receiving a set of Web page data by a user processor, the set of Web page data being for displaying a Web page, and the Web page including at least one hidden field;
- receiving, by the user processor, authentication data from a payment account issuer, the authentication data being for authenticating an identity of an account holder of a payment account issued by the payment account issuer; and
- filling the at least one hidden field with the authentication data, by the user processor, for sending the authentication data to a merchant.

69. A computer-readable medium according to claim 68, wherein the set of instructions is further operable to direct the at least one processor to perform the step of sending, from the user processor to the payment account issuer, a request for authentication of the identity of the account holder, the authentication data being sent from the payment account issuer to the user processor in response to the request for the authentication of the identity of the account holder.

70. A computer-readable medium according to claim 69, wherein the set of instructions is further operable to direct the at least one processor to perform the steps of:
- sending an authorization request message from the merchant to a payment organization, the authorization request message being derived from the authentication data;
- sending, from the payment organization to the payment account issuer, at least one of the authorization request message and a message derived from the authorization request message;
- using, by the payment account issuer, a verification procedure to process the at least one of the authorization request message and the message derived from the authorization request message, for generating an authorization response message;
- sending the authorization response message from the payment account issuer to the payment organization; and
- sending, from the payment organization to the merchant, at least one of the authorization response message and a message derived from the authorization response message.

71. A computer-readable medium according to claim 69, wherein the set of instructions is further operable to direct the at least one processor to perform the steps of:
- sending a first authorization request message from the merchant to an acquirer, the first authorization request message being derived from the authentication data;
- sending, from the acquirer to a payment organization, at least one of the first authorization request message and a second authorization request message derived from the first authorization request message;
- sending, from the payment organization to the payment account issuer, at least one of the at least one of the first and second authorization request messages and a third authorization request message derived from the at least one of the first and second authorization request messages;
- using, by the payment account issuer, a verification procedure to process the at least one of the at least one of the first and second authorization request messages and the third authorization request message, for generating a first authorization response message;
- sending the first authorization response message from the payment account issuer to the payment organization;
- sending, from the payment organization to the acquirer, at least one of the first authorization response message and a second authorization response message derived from the first authorization response message; and
- sending, from the acquirer to the merchant, at least one of the at least one of the first and second authorization response messages and a third authorization response message derived from the at least one of the first and second authorization response messages.

72. A computer-readable medium according to claim 68, wherein the set of instructions is further operable to direct the at least one processor to perform the steps of:
- sending an authorization request message from the merchant to a payment organization, the authorization request message being derived from the authentication data;
- sending, from the payment organization to the payment account issuer, at least one of the authorization request message and a message derived from the authorization request message;

using, by the payment account issuer, a verification procedure to process the at least one of the authorization request message and the message derived from the authorization request message, for generating an authorization response message;

sending the authorization response message from the payment account issuer to the payment organization; and sending, from the payment organization to the merchant, at least one of the authorization response message and a message derived from the authorization response message.

73. A computer-readable medium according to claim 68, wherein the set of instructions is further operable to direct the at least one processor to perform the steps of:

sending a first authorization request message from the merchant to an acquirer, the first authorization request message being derived from the authentication data;

sending, from the acquirer to a payment organization, at least one of the first authorization request message and a second authorization request message derived from the first authorization request message;

sending, from the payment organization to the payment account issuer, at least one of the at least one of the first and second authorization request messages and a third authorization request message derived from the at least one of the first and second authorization request messages;

using, by the payment account issuer, a verification procedure to process the at least one of the at least one of the first and second authorization request messages and the third authorization request message, for generating a first authorization response message;

sending the first authorization response message from the payment account issuer to the payment organization;

sending, from the payment organization to the acquirer, at least one of the first authorization response message and a second authorization response message derived from the first authorization response message; and sending, from the acquirer to the merchant, at least one of the at least one of the first and second authorization response messages and a third authorization response message derived from the at least one of the first and second authorization response messages.

74. A computer-readable medium according to claim 68, wherein the set of instructions is further operable to direct the at least one processor to perform the steps of:

sending an authorization request message from the merchant to a payment organization, the authorization request message being derived from the authentication data;

using, by the payment organization, a verification procedure to process the authorization request message, for generating an authorization response message; and sending the authorization response message from the payment organization to the merchant.

75. A computer-readable medium according to claim 68, wherein the set of instructions is further operable to direct the at least one processor to perform the steps of:

sending a first authorization request message from the merchant to an acquirer, the first authorization request message being derived from the authentication data;

sending, from the acquirer to a payment organization, at least one of the first authorization request message and a second authorization request message derived from the first authorization request message;

using, by the payment organization, a verification procedure to process the at least one of the first and second authorization request messages, for generating a first authorization response message;

sending the first authorization response message from the payment organization to the acquirer; and sending, from the acquirer to the merchant, at least one of the first authorization response message and a second authorization response message derived from the first authorization response message.

76. A computer-readable medium having a set of instructions operable to direct a processor to perform the steps of:

receiving a first set of Web page data by a user processor, the first set of Web page data being for displaying a first Web page;

determining, by the user processor, whether the first Web page includes a first hidden field, the first hidden field being for indicating to the user software that the first Web page is capable of being used for performing a single-click payment procedure; and if the first Web page includes the first hidden field, filling the first hidden field, by the user processor, with data for informing a merchant that the user software is being used for performing at least one payment transaction.

77. A method according to claim 76, wherein the set of instructions is further operable to direct the at least one processor to perform the step of receiving, from an account holder, a signal for selecting the single-click payment procedure to be performed using the first Web page.

78. A method according to claim 77, wherein the set of instructions is further operable to direct the at least one processor to perform the steps of:

receiving a second set of Web page data by the user processor, the second set of Web page data representing a second Web page, the second Web page including a second hidden field;

filling the second hidden field with authentication data, by the user processor, for sending the authentication data to the merchant, the authentication data being for authenticating an identity of the account holder; and initiating transmission of the authentication data to the merchant.

79. A method according to claim 78, wherein the set of instructions is further operable to direct the at least one processor to perform the step of receiving the authentication data, by the user processor, from a payment account issuer which has issued a payment account to the account holder.

80. A computer-readable medium according to claim 79, wherein the set of instructions is further operable to direct the at least one processor to perform the steps of:

sending an authorization request message from the merchant to a payment organization, the authorization request message being derived from the authentication data;

sending, from the payment organization to the payment account issuer, at least one of the authorization request message and a message derived from the authorization request message;

using, by the payment account issuer, a verification procedure to process the at least one of the authorization request message and the message derived from the authorization request message, for generating an authorization response message;

sending the authorization response message from the payment account issuer to the payment organization; and sending, from the payment organization to the merchant, at least one of the authorization response message and a message derived from the authorization response message.

81. A computer-readable medium according to claim 79, wherein the set of instructions is further operable to direct the at least one processor to perform the steps of:

sending a first authorization request message from the merchant to an acquirer, the first authorization request message being derived from the authentication data;

sending, from the acquirer to a payment organization, at least one of the first authorization request message and a second authorization request message derived from the first authorization request message;

sending, from the payment organization to the payment account issuer, at least one of the at least one of the first and second authorization request messages and a third authorization request message derived from the at least one of the first and second authorization request messages;

using, by the payment account issuer, a verification procedure to process the at least one of the at least one of the first and second authorization request messages and the third authorization request message, for generating a first authorization response message;

sending the first authorization response message from the payment account issuer to the payment organization;

sending, from the payment organization to the acquirer, at least one of the first authorization response message and a second authorization response message derived from the first authorization response message; and sending, from the acquirer to the merchant, at least one of the at least one of the first and second authorization response messages and a third authorization response message derived from the at least one of the first and second authorization response messages.

* * * * *